(12) United States Patent
Han et al.

(10) Patent No.: US 9,225,891 B2
(45) Date of Patent: Dec. 29, 2015

(54) DISPLAY APPARATUS AND METHOD FOR CONTROLLING DISPLAY APPARATUS THEREOF

(71) Applicant: SAMSUNG ELECTRONICS CO., LTD., Suwon-si (KR)

(72) Inventors: Sang-jin Han, Gunpo-si (KR);
Min-hyung Kim, Seoul (KR);
Jung-geun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/763,118

(22) Filed: Feb. 8, 2013

(65) Prior Publication Data
US 2013/0208135 A1 Aug. 15, 2013

Related U.S. Application Data

(60) Provisional application No. 61/596,926, filed on Feb. 9, 2012.

(30) Foreign Application Priority Data

Sep. 12, 2012 (KR) .......... 10-2012-0101158

(51) Int. Cl.
*H04N 5/228* (2006.01)
*H04N 5/232* (2006.01)
(Continued)

(52) U.S. Cl.
CPC .............. *H04N 5/23203* (2013.01); *G06F 3/01* (2013.01); *G06F 3/017* (2013.01); *G06F 3/0482* (2013.01); *H04N 21/4223* (2013.01); *H04N 21/42203* (2013.01); *H04N 21/44218* (2013.01); *H04N 21/47* (2013.01); *H04N 21/4854* (2013.01); *G06F 2203/0381* (2013.01); *G06F 2203/04805* (2013.01); *G06F 2203/04806* (2013.01)

(58) Field of Classification Search
CPC .............. G06F 2203/0381; G06F 2203/04806; G06F 2203/04808; G06F 3/048; G06F 3/017; G06F 3/0484; H04N 21/44218; H04N 21/44213
USPC ...................................................... 348/207.1
See application file for complete search history.

(56) References Cited

U.S. PATENT DOCUMENTS 8,144,184 B2 * 3/2012 Carter .................. 348/14.06
2005/0187015 A1 * 8/2005 Suzuki et al. ............. 463/32
(Continued)

FOREIGN PATENT DOCUMENTS

KR 10-2012-0020045 A 3/2012
WO 2011/059202 A2 5/2011

OTHER PUBLICATIONS

Communication dated Jul. 4, 2013 issued by the European Patent Office in counterpart European Patent Application No. 13154601.2.
(Continued)

*Primary Examiner* — Antoinette Spinks
(74) *Attorney, Agent, or Firm* — Sughrue Mion, PLLC

(57) ABSTRACT

An display apparatus and a method of setting a view angle thereof are provided. The method includes in response to an occurrence of a predetermined event, displaying, on an area of a display screen, a view angle guiding user interface which guides setting a view angle of a camera connected to the display apparatus; and setting the view angle of the camera using the view angle guiding UI.

15 Claims, 38 Drawing Sheets

(51) Int. Cl.
  *G06F 3/01* (2006.01)
  *G06F 3/0482* (2013.01)
  *H04N 21/4223* (2011.01)
  *H04N 21/442* (2011.01)
  *H04N 21/422* (2011.01)
  *H04N 21/47* (2011.01)
  *H04N 21/485* (2011.01)

(56) References Cited

U.S. PATENT DOCUMENTS

| | | |
|---|---|---|
| 2006/0119572 A1 | 6/2006 | Lanier |
| 2006/0146009 A1* | 7/2006 | Syrbe et al. |
| 2006/0209021 A1* | 9/2006 | Yoo et al. ................ 345/156 |
| 2009/0073313 A1 | 3/2009 | Liu |
| 2009/0153288 A1 | 6/2009 | Hope et al. |
| 2010/0019922 A1 | 1/2010 | Van Loenen et al. |
| 2010/0039378 A1 | 2/2010 | Yabe et al. |
| 2011/0025829 A1* | 2/2011 | McNamer et al. ............ 348/50 |
| 2011/0274316 A1 | 11/2011 | Jeong et al. |
| 2012/0050273 A1 | 3/2012 | Yoo et al. |
| 2013/0198669 A1* | 8/2013 | Gao et al. ................... 715/771 |
| 2014/0009586 A1* | 1/2014 | McNamer et al. ............ 348/50 |
| 2014/0152812 A1* | 6/2014 | Yamazaki et al. .......... 348/135 |
| 2014/0247325 A1* | 9/2014 | Wu et al. ..................... 348/39 |

OTHER PUBLICATIONS

International Search Report for PCT/KR2013/008262 dated Jan. 20, 2014 [PCT/ISA/210].
Written Opinion for PCT/KR2013/008262 dated Jan. 20, 2014 [PCT/ISA/237].

* cited by examiner

DISPLAY APPARATUS AND METHOD FOR CONTROLLING DISPLAY APPARATUS THEREOF

CROSS-REFERENCE TO RELATED APPLICATIONS

This application claims the benefit of U.S. Provisional Patent Application No. 61/596,926, filed on Feb. 9, 2012, in the United States Patents and Trademark Office and priority from Korean Patent Application No. 10-2012-0101158, filed on Sep. 12, 2012, in the Korean Intellectual Property Office, the disclosure of which is incorporated herein by reference.

BACKGROUND

1. Field

Methods and apparatuses consistent with the exemplary embodiments relate to an display apparatus and method for controlling display apparatus thereof, and more particularly to an display apparatus which is controlled according to user voice or user motion, and a method for controlling display apparatus thereof.

2. Description of the Related Art

Recent technological developments increased the supply of various types of display apparatuses. In particular, various types of display apparatuses including television (TVs) are used in consumer homes. The functions of these display apparatuses have gradually expanded according to requests by users. For example, a TV can be connected to the Internet to support Internet services. Also, a user views a larger number of digital broadcast channels through the TV.

Therefore, various input methods for efficiently using various functions of an display apparatus are required. For example, an input method using a remote control, an input method using a mouse, an input method using a touch pad, etc. are applied to the display apparatus.

However, it is difficult to efficiently use the various functions of the display apparatus by using only such a simple method. For example, if all functions of the display apparatus are controlled through only a remote control, increasing the number of buttons of the remote control is inevitable. In this case, it is not easy for an average user to learn how to use the remote control. Also, according to a method of displaying various menus on a screen to assist a user to search for and select a corresponding menu, the user has to check a complicated menu tree in order to select a desired menu which may be difficult and confusing to a user.

Accordingly, to provide an display apparatus which is controlled more conveniently and intuitively, technology based on voice and motion recognition is being developed. In such a system to control display apparatus using voice or motion recognition, a user interface (UI) is necessary to guide the user about the voice or motion recognition.

However, an adequate UI for controlling an display apparatus using voice or motion recognition has not been developed, therefore a user experiences inconvenience when controlling the display apparatus using voice or motion recognition.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

Exemplary embodiments provide an display apparatus which provides various UIs for a user to control the display apparatus more conveniently using voice recognition or motion recognition, and a control method thereof.

According to an aspect of an exemplary embodiment, there is provided a method for controlling an display apparatus is provided, the method including displaying first voice guide information to guide user voice to control the display apparatus, inputting a user command to control an external device connected to the display apparatus, and in response to the input user command, changing the first voice guide information and displaying second voice guide information to guide the user voice to control the external device.

The method may additionally include searching a plurality of voice guide information previously stored in the display apparatus to find the second voice guide information that corresponds to the external device, and reading the second voice guide information.

If the display apparatus is a TV the first voice guide information may include at least one of a voice command regarding power control, a voice command regarding executing the external device, a voice command regarding channel setting, and a voice command regarding volume setting, and if the external device is one of a DVD player and a BD player, the second voice guide information may include at least one of a voice command regarding power control, a voice command regarding executing the external device, and a voice command regarding playback setting.

The method may additionally include, if the first voice guide information is displayed, and if user voice command contained in the first voice guide information is input, controlling the display apparatus according to the user voice command, and if the second voice guide information is displayed, and if user voice command contained in the second voice guide information is input, generating a control signal corresponding to the input user voice command and transmitting the generated control signal to the external device.

The method may additionally include, if the second voice guide information is displayed, and if user voice command corresponding to one of the voice commands included in the second voice guide information is input, generating a control signal corresponding to the input user voice command, and wirelessly transmitting the generated control signal to a relay device to transmit to the external device.

The generated control signal may be transmitted to the relay device by Bluetooth communication, and the relay device may convert the transmitted control signal into an IR signal and transmit the converted signal to the external device.

The first and second voice guide information may each include an icon which indicates that the operation mode of the display apparatus is a voice control mode.

The first and second voice guide information may be displayed on a bottom of a screen on which content is displayed.

The user command may be user voice command input through a voice input unit to control an external device.

According to an aspect of an exemplary embodiment, there is provided an display apparatus including a voice input unit which receives user voice, a display, and a controller which displays on the display first voice guide information to guide user voice to control the display apparatus, and if a user command to control an external device connected to the display apparatus is input, changes the first voice guide information and displays second voice guide information to guide user voice to control the external device.

The display apparatus may additionally include a storage unit which stores a plurality of voice guide information, wherein the controller may search the plurality of stored voice guide information of the storage unit to find the second voice guide information corresponding to the external device.

If the display apparatus is a television (TV), the first voice guide information may include at least one of a voice command regarding power control, a voice command regarding executing external device, a voice command regarding channel setting, and a voice command regarding volume setting, and if the external device is one of a DVD player and a Blu-ray (BD) player, the second voice guide information may include at least one of a voice command regarding power control, a voice command regarding executing external device, and a voice command regarding playback setting.

The display apparatus may additionally include an external terminal input unit which performs connection to the external device, wherein, if the first voice guide information is displayed, and if user voice contained in the first voice guide information is input, the controller may control the display apparatus according to the user voice command, and if the second voice guide information is displayed, and if user voice command contained in the second voice guide information is input, the controller may generate a control signal corresponding to the input user voice command and transmit the generated control signal to the external device.

The display apparatus may additionally include a network interface which performs communication with a relay device which performs communication with the external device, wherein, if the second voice guide information is displayed, and if a use voice command corresponding to one of the voice commands included in the second voice guide information is input, the controller may generate a control signal corresponding to the input user voice command, and wirelessly transmit the generated control signal to a relay device to transmit to the external device.

The generated control signal may be transmitted to the relay device by Bluetooth communication, and the relay device may convert the transmitted control signal into an infrared (IR) signal and transmit the converted signal to the external device.

The first and second voice guide information may each include an icon which indicates that the operation mode of the display apparatus is a voice control mode.

The first and second voice guide information may be displayed on a bottom of a screen on which content is displayed.

The user command may be user voice command input through a voice input unit to control an external device.

According to an aspect of another exemplary embodiment, there is provided a method for controlling an display apparatus is provided, the method including displaying first motion guide information to guide a user motion to control the display apparatus, inputting a user command to control an external device connected to the display apparatus, and in response to the input user command, changing the first motion guide information and displaying second motion guide information to guide the user motion to control the external device.

According to an aspect of another exemplary embodiment, there is provided an display apparatus including a voice motion unit which receives a user motion, a display, and a controller which displays on the display first motion guide information to guide user motion to control the display apparatus, and if user command to control an external device connected to the display apparatus is input, changes the first motion guide information and displays second motion guide information to guide user motion to control the external device.

According to an aspect of another exemplary embodiment, there is provided a method of setting a view angle of an display apparatus, the method including in response to an occurrence of a predetermined event, displaying, on an area of a display screen, a view angle guiding UI which guides setting a view angle of a camera connected to the display apparatus, when a predetermined event occurs; and setting the view angle of the camera using the view angle guiding UI.

The view angle guiding UI may not be displayed when an event of entering a motion task mode occurs.

The view angle guiding UI may include a screen which displays an image that is being photographed by the camera during setting the view angle.

The setting may include adjusting the camera so that the view angle of the camera automatically moves in a predetermined direction at a predetermined speed; and when a user command is input during the adjusting of the camera, setting a view angle at a point when the user command is input as the view angle of the camera.

The setting may include adjusting the camera according to a user's manipulation using an external device; and when a user command is input during the adjusting of the camera, setting a view angle, at a point when the user command is input, as the view angle of the camera.

The predetermined event may be one of an event where power is applied to the display apparatus during an initial installation of the display apparatus, an event where a motion task mode is turned on, and an event where a view angle setting menu is selected of among control menus of the display apparatus.

The camera may be a motion capture camera which photographs the user's motion for controlling the display apparatus in a motion task mode.

According to an aspect of another exemplary embodiment, there is provided an display apparatus including a camera which photographs a user's motion; display; and a controller which, in response to an occurrence of a predetermined event, displays, on an area of the display, a view angle guiding UI which guides setting a view angle of the camera, and sets the view angle of the camera using the view angle guiding U.

The controller may not display the view angle guiding UI by display a screen provided by the display apparatus, when an event of entering a motion task mode occurs.

The view angle guiding UI may include a screen which displays an image that is being photographed by the camera when setting the view angle.

The controller may adjust the camera so that the view angle of the camera automatically moves in a predetermined direction at a predetermined speed, and may set the view angle at a point when a user command is input as a view angle of the camera, when the user command is input during adjusting the camera.

The controller may adjust the camera according to a user's manipulation using an external device, and set the view angle at a point when a user command is input as the view angle of the camera, when the user command is input during adjusting the camera.

The predetermined event may be one of an event where power is applied to the display apparatus during initial installation of the display apparatus, an event where a motion task mode is turned on, and an event where a view angle setting menus is selected of among control menus of the display apparatus.

The camera may be a motion capture camera which photographs the user's motion for controlling the display apparatus in a motion task mode.

According to an aspect of another exemplary embodiment, there is provided a method for controlling of an display apparatus, the method including: if a motion start command is input, displaying an icon and a pointer to perform a motion task mode, moving the pointer in accordance with a first user motion, and if a second user motion is input while the pointer is placed on the icon, executing a function corresponding to the icon.

The pointer placed on the icon may be fixed without being moved while the second user motion is input.

The executing may include, if the pointer is placed on the icon and input of the second user motion is maintained, continuously executing the function of the icon on which the pointer is placed.

The first user motion may be a spread motion of spreading a user's hand, and the second user motion may be a grab motion of clenching the user's hand.

The icon may include at least one of a volume-up icon, a volume-down icon, a channel-up icon, and a channel-down icon.

The icon may include a volume-up icon and a volume-down icon which are displayed on one of a left area and a right area of a display screen, and a channel-up icon and a channel-down icon which are displayed the other one of the left area and the right area of the display screen.

Volume level information currently set in the display apparatus may be displayed on an area on which the volume-up icon and the volume-down icon are displayed, and channel information currently set in the display apparatus may be displayed on an area on which the channel-up icon and the channel-down icon are displayed.

The method may further include, if a motion end motion is input, removing the icons and the pointer from the display screen.

According to an aspect of another exemplary embodiment, there is provided an display apparatus, including: a motion input unit which receives input of a user motion, a display, and a controller which, if a motion start command is input through the motion input unit, displays an icon and a pointer to perform a motion task mode, controls the display unit to move the pointer in accordance with a first user motion which is input through the motion input unit, and, if a second user motion is input through the motion input unit while the pointer is placed on the icon, executes a function corresponding to the icon.

While the second user motion is input, the controller may fix the pointer without moving the pointer.

If the pointer is placed on the icon and input of the second user motion is maintained, the controller may continuously execute the function of the icon on which the pointer is placed.

The first user motion may be a spread motion of spreading a user's hand, and the second user motion may be a grab motion of clenching the user's hand.

The icon may include at least one of a volume-up icon, a volume-down icon, a channel-up icon and a channel-down icon.

The icon may include a volume-up icon and a volume-down icon which are displayed on one of a left area and a right area of a display screen, and a channel-up icon and a channel-down icon which are displayed the other one of the left area and the right area of the display screen.

Volume level information currently set in the display apparatus may be displayed on an area on which the volume-up icon and the volume-down icon are displayed, and channel information currently set in the display apparatus may be displayed on an area on which the channel-up icon and the channel-down icon are displayed.

If a motion end motion is input through the motion input unit, the controller may remove the icons and the pointer from the display screen of the display unit.

According to an aspect of another exemplary embodiment, there is provided a method of controlling an display apparatus which recognizes voice, the method may including receiving a voice start command; and if the voice start command is a first voice start command, changing a mode of the display apparatus to a first voice task mode which is controlled according to user voice input into a voice input unit of the display apparatus, and if the voice start command is a second voice start command, changing the mode of the display apparatus to a second voice task mode which is controlled according to user voice input into an external apparatus which operates along with the display apparatus; and displaying voice guide information corresponding to the changed voice task mode.

The first voice start command may be user voice command which comprises a preset word, and the second voice start command may be a user command which is to press a preset button of the external apparatus.

The voice guide information may include an icon area which indicates the changed mode of the first voice task mode and second voice task mode.

The voice guide information may include a plurality of voice commands which guide user voice to perform the voice task mode, and the voice commands included in the voice guide information of the first voice task mode and the voice guide information of the second voice task may be different from each other.

The voice guide information of the first voice task mode may include a voice command which is to perform a channel up/down command, and the voice guide information of the second voice task mode may not include a voice command which is to perform a channel up/down command and may include a voice command which is to provide a channel list.

The second voice task mode may be to press a preset second button of the external apparatus and may be controlled by user voice input into the external apparatus.

Furthermore, the external device may be a remote control.

According to an aspect of another exemplary embodiment, there is provided an display apparatus including a voice input unit which receives an input of user voice; display; and controller which if a voice start command input through the voice input unit is a first voice start command, changes the mode of the display apparatus to a first voice task mode controlled according to user voice input into the voice input unit of the display apparatus, and if the voice start command is a second voice start command, changes the mode of the display apparatus to a second voice task mode controlled according to user voice input into the external apparatus which operates along with the display apparatus.

The first voice start command may be user voice command which comprises a preset word, and the second voice start command may be a user command which is to press a preset button of the external apparatus.

The voice guide information may include an icon area which indicates the changed mode of the first voice task mode and second voice task mode.

The voice guide information may include a plurality of voice commands which guide user voice to perform the voice task mode, and the voice commands included in the voice guide information of the first voice task mode and the voice guide information of the second voice task may be different from each other.

The voice guide information of the first voice task mode may include a voice command which is to perform a channel up/down command, and the voice guide information of the second voice task mode may not include a voice command which is to perform a channel up/down command and may include a voice command which is to provide a channel list.

The second voice task mode may be to press a preset second button of the external apparatus and may be controlled by user voice input into the external apparatus.

The external device may be a remote control.

According to an aspect of another exemplary embodiment, there is provided a method of controlling an display apparatus, the method including receiving a two hand start command which is to perform a motion task using two hands; if the two hand start command is input, changing a mode of the display apparatus to a two hand task mode which is to perform the motion task using the two hands; and if the mode of the display apparatus is changed to the two hand task mode, displaying a two hand input guide graphical user interface (GUI) which is to perform the motion task using the two hands.

The receiving of the two hand start command may include, if a motion start command using one hand is input, changing the mode of the display apparatus to the motion task mode which is to perform the motion task; and if a motion start command using the other hand is input when the mode of the display apparatus is changed to the motion task mode, recognizing that the two hand start command has been input.

The receiving of the two hand start command may include, if a shake motion of simultaneously shaking the two hands a plurality of times is input, recognizing that the two hand start command has been input.

The motion task using the two hands may be a task of magnifying or reducing a display screen.

The method may further include, if a motion of making the two hands distant from each other is input when the two hand input guide GUI is displayed in an area of the display screen, magnifying a display screen based on a predetermined location in an area where the two hand input guide GUI is displayed; and if a motion of making the two hands close to each other is input, reducing a display screen based on the predetermined location in an area where the two hand input guide GUI is displayed.

The display of the two hand input guide GUI may include displaying a two hand circular input guide GUI in a central area of the display screen.

The method may further include if a motion of moving the two hands is input, moving the two hand input guide GUI so that the two hand circular input guide GUI corresponds to the motion of moving the two hands.

The two hand input guide GUI may be two pointers which are displayed in places corresponding to positions of the two hands of a user. The motion task using the two hands may be a task of magnifying or reducing the display screen by using the two pointers.

According to an aspect of another exemplary embodiment, there is provided an display apparatus including a motion input unit which receives a motion of a user; a display; and a controller which, if a two hand start command which is to perform a motion task using two hands is input through the motion input unit, changes a mode of the display apparatus to a two hand task mode which is to perform the motion task using the two hands and displays a two hand input guide GUI, which is to perform the motion task using the two hands, on the display unit.

If a motion start command using one hand is input through the motion input unit, the controller may change the mode of the display apparatus to a motion task mode which is to perform a motion task, and, if a motion start command using the other hand is input through the motion input unit when the mode of the display apparatus is changed to the motion task mode, may recognize that the two hand start command has been input.

If a shake motion of simultaneously shaking the two hands a plurality of times is input through the motion input unit, the controller may recognize that the two hand start command has been input.

The motion task using the two hands may be a task of magnifying or reducing a display screen.

If a motion of making the two hands distant from each other is input when the two hand input guide GUI is displayed in an area of the display screen, the controller may magnify a display screen based on a predetermined location in an area where the two hand input guide GUI is displayed and reduce a display screen based on the predetermined location where the two hand input guide GUI is displayed if a motion of making the two hands close to each other.

The two hand input guide GUI may be a two hand circular input guide GUI which is displayed in a central area of the display screen.

If a motion of moving the two hands is input through the motion input unit, the controller may move the two hand circular input guide GUI so that the two hand input guide GUI corresponds to the motion of moving the two hands.

The two hand input guide GUI may be two pointers which are displayed in places corresponding to positions of the two hands of a user. The motion task using the two hands may be a task of magnifying or reducing the display screen by using the two pointers.

According to an aspect of another exemplary embodiment, there is provided a method of controlling an display apparatus, the method including receiving a voice start command through a voice input unit; if the voice start command is input, changing a mode of the display apparatus to a voice task mode; and if a voice recognition error occurs in the voice task mode, displaying one of a plurality of feedback messages which are to show the voice recognition error.

The method may further include if the voice recognition error repeatedly occurs in the voice task mode, randomly selecting and displaying one of the plurality of feedback messages.

The voice task mode may include a first voice task mode which is controlled according to user voice input into the voice input unit of the display apparatus and a second voice task mode which is controlled according to user voice input into an external apparatus which operates along with the display apparatus.

The plurality of feedback messages may be differently displayed according to a type of the voice task mode.

The plurality of feedback messages may be differently displayed according to a type of the voice recognition error.

The voice recognition error may include at least one of an error in accurately recognizing user voice input through the voice input unit, an error in pressing a recognition button of the external apparatus for a preset time after user voice is input, and an error in inputting user voice for a preset time after a recognition button of the external apparatus is pressed.

The display of the one of the plurality of feedback messages may include if the voice recognition error occurs for the first time, displaying a defaulted feedback message.

According to an aspect of another exemplary embodiment, there is provided an display apparatus including a voice input unit which receives user voice; a display; and a controller which, if a voice start command is input through the voice input unit, changes a mode of the display apparatus to a voice task mode, and if a voice recognition error occurs in the voice task mode, displays one of a plurality of feedback messages for showing the voice recognition error on the display unit.

If the voice recognition error repeatedly occurs in the voice task mode, the controller may randomly select and display one of the plurality of feedback messages.

The voice task mode may include a first voice task mode which is controlled according to user voice input into the voice input unit of the display apparatus and a second voice task mode which is controlled according to user voice input into an external apparatus which operates along with the display apparatus.

The plurality of feedback messages may be differently displayed according to a type of the voice task mode.

The plurality of feedback messages may be differently displayed according to a type of the voice recognition error.

The voice recognition error may include at least one of an error in accurately recognizing user voice input through the voice input unit, an error in pressing a recognition button of the external apparatus for a preset time after user voice is input, and an error in inputting user voice for a preset time after a recognition button of the external apparatus is pressed.

If the voice recognition error occurs for the first time, the controller may display a defaulted feedback message on the display unit.

According to an aspect of another exemplary embodiment, a method for controlling an display apparatus is provided, the method including inputting a voice start command through a voice input unit, if a voice start command is input, changing a mode of the display apparatus to a voice task mode in which the display apparatus is controlled in accordance with user voice, and displaying voice guide information including a plurality of voice commands to perform the voice task mode on the display apparatus, and changing at least one from among the plurality of voice commands with a different voice command in accordance with a user's input.

The voice guide information may include a fixed command area on which the voice commands are fixedly displayed, and a changeable command area on which the voice commands are subject to change.

The fixed command area may include a voice command to perform a power-off function of the display apparatus.

The changing may include in response to a user command directing to execute an application, executing the application, and with the executing of the application, changing at least one from among the plurality of voice commands with a voice command corresponding to the executed application.

The changing may include inputting a user command directing to display a user's favorite voice command, and in response to the user command as input, changing at least one from among the plurality of voice command s with the user's favorite voice command set by the user.

The changed voice guide information may include a voice command to perform returning to the voice guide information before change.

According to an aspect of another exemplary embodiment, there is provided an display apparatus including a voice input unit which receives user voice, a display, and a controller which changes a mode of the display apparatus to a voice task mode in which the display apparatus is controlled by user voice, displays voice guide information including a plurality of voice commands to perform the voice task mode on the display apparatus, and changes at least one from among the plurality of voice commands with a different voice command in accordance with a user's input, if a voice start command is input through the voice input unit.

The voice guide information may include a fixed command area on which the voice commands are fixedly displayed, and a changeable command area on which the voice commands are subject to change.

The fixed command area may include a voice command to perform a power-off function of the display apparatus.

In response to a user command directing to execute an application, the controller may execute the application, and change at least one from among the plurality of voice commands with a voice command corresponding to the executed application.

If a user command directing to display a user's favorite voice command is input, the controller may change at least one from among the plurality of voice commands with the user's favorite voice command set by the user.

The changed voice guide information may include a voice command to perform returning to the voice guide information before change.

According to an aspect of another exemplary embodiment, a control method of an display apparatus is provided, the method including inputting a motion start command through a motion input unit, if a motion start command is input, changing a mode of the display apparatus to a motion task mode in which the display apparatus is controlled in accordance with a user's motion, and displaying motion guide information including a plurality of motion commands to perform the motion task mode on the display apparatus, and if a command directing to execute an application is input, changing at least one from among the plurality of motion commands with a motion command corresponding to the executed application.

According to an aspect of another exemplary embodiment, there is provided an display apparatus including a motion input unit which receives a user's motion, a display, and a controller which changes a mode of the display apparatus to a motion task mode in which the display apparatus is controlled in accordance with a user's motion, and displays motion guide information including a plurality of motion commands to perform the motion task mode on the display apparatus, if a motion start command is input, and which changes at least one from among the plurality of motion commands with a motion command corresponding to the executed application, if a command directing to execute an application is input.

According to an aspect of another exemplary embodiment, there is provided a method of setting a view angle of an display apparatus, the method including displaying a view angle guiding user interface (UI) which guides through setting a view angle of a camera; and setting the view angle of the camera using the view angle guiding UI.

The method may also include: automatically adjusting an angle of the camera at a predetermined speed; and receiving a user command during the adjusting of the angle of the camera, wherein the setting of the view angle of the camera sets the view angle of the camera to the angle of camera at a point in time when the user command is received.

The displaying the view angle guiding UI may occur in response to an occurrence of a predetermined event comprising at least one of an event where power is applied to the display apparatus during an initial installation of the display apparatus, an event where a motion task mode is turned on, and an event where a view angle setting menu is selected from among control menus of the display apparatus.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
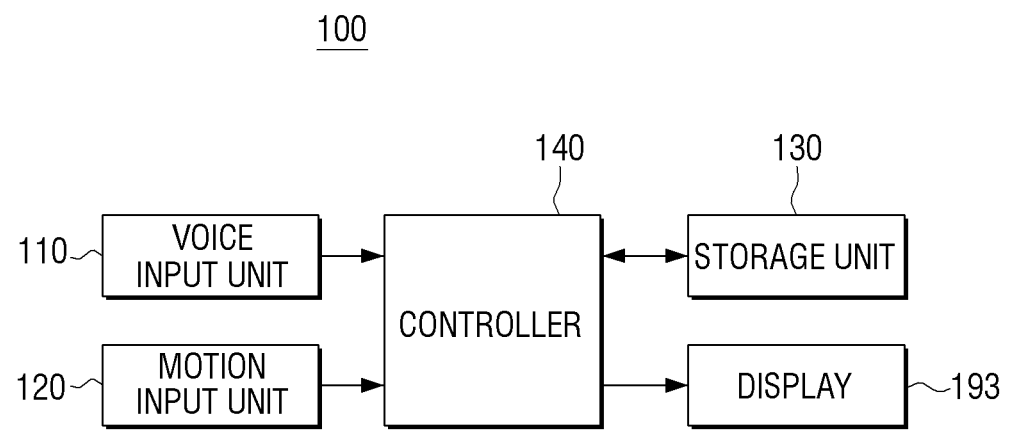
FIGS. 1 to 3 are block diagrams illustrating a structure of an display apparatus according to various aspects of exemplary embodiments.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a schematic block diagram illustrating an display apparatus 100 according to an exemplary embodiment of the present general inventive concept.

Referring to FIG. 1, the display apparatus 100 includes a voice input unit 110, motion input unit 120, storage unit 130, controller 140 and display 193. Here, the display apparatus 100 may be implemented as a smart TV, a set-top box, or a PC which may be connected to an external network, a digital TV, a portable phone, or the like but is not limited thereto.

The voice input unit 110 receives a voice uttered by a user. The voice input unit 110 converts an input voice signal into an electric signal and outputs the electric signal to the controller 140. For example, the voice input unit 110 may be implemented as a microphone. Also, the voice input unit 110 may be installed in the display apparatus 100 in an all-in-one shape or may be installed separately from the display apparatus 100. The separated voice input unit 110 may be connected to the display apparatus 100 through a wire or wireless network.

The motion input unit 120 receives an image signal of a user's photographed motion (e.g., successive frame) and provides the same to the controller 140. By way of example, the motion input unit 120 may be implemented as a camera unit which includes a lens and an image sensor. Further, the motion input unit 120 may be provided integrally with the display apparatus 100, or provided separately. If provided separately, the motion recognition unit 120 may connect to the display apparatus 100 through a wire or wireless network.

The storage unit 130 may store various data and programs to drive and control the display apparatus 100. The storage unit 130 may also store a voice recognition module to recognize voice input through the voice input unit 110 and a motion recognition module to recognize motion input through the motion input unit 120.

The storage unit 130 may include voice database and motion database. As used herein, the voice database refers to database on which preset voices and voice tasks matching the preset voices are recorded. The motion database refers to database on which preset motions and motion tasks matching the preset motions are recorded.

The display 193 may display an image corresponding to the broadcast signal received through the broadcast receiver. The display 193 may display image data (e.g., video) which is input through an external terminal input unit. The display 193 may also display voice guide information to perform voice task and motion guide information to perform motion task according to the control by the controller 140.

The controller 140 may control the voice input unit 110, the motion input unit 120, and the storage unit 130. The controller 140 may include a central processing unit (CPU) and a module to control the display apparatus 100, and a Read Only Memory (ROM) and a Random Access Memory (RAM) to store data.

If voice is input through the voice input unit 110, the controller 140 recognizes the voice using the voice recognition module and the voice database. The voice recognition may be mainly categorized into an isolated word recognition which recognizes voice utterance based on isolated words, a continuous speech recognition which recognizes continuous sentences and conversational voice, and a keyword spotting in the hybrid form of the isolated word recognition and the continuous speech recognition, which detects and recognizes predetermined keywords.

If the user voice is input, the controller 140 detects beginning and ending of the voice utterance of the user within the input voice signal, to thus determine voice segment. The controller 140 may detect the voice segment by calculating the energy of the input voice signal, dividing the energy levels of the voice signal according to the calculated energies, and implementing dynamic programming. The controller 140 detects the phoneme, which is the smallest unit of the voice, based on the acoustic model from the voice signal within the detected voice segment and generates phoneme data. The controller 140 implements Hidden Markov Model (HMM) on the generated phoneme data to generate text information. However, the method for perceiving user voice is not limited to the example explained above. Accordingly, various other methods may be implemented to recognize the user voice. As a result, the controller 140 may recognize the user voice contained in the voice signal.

If receiving a motion through the motion input unit 120, the controller 140 recognizes the motion using the motion recognition module and the motion database. The motion recognition may include perceiving continuous hand motions by use of the motion recognition module, by distinguishing an image (e.g., successive frames) corresponding to the user's motion input through the motion input unit 120 into background and hand areas (e.g., hand unfolding or clenching). If the user's motion is input, the controller 140 stores the received image in frame unit and detects an object by using the stored frames. The controller 140 detects the object by detecting at least one of shape, color or motion of the object included in the frames. The controller 140 may trace the detected motion of the object by using the location of the object respectively included in the plurality of frames.

The controller 140 determines motion in accordance with the motion of the traced object. By way of example, the controller 140 determines user's motion by using at least one of changes in the shape of the object, speed, location and direction of the object. The user's motion may include a grab in which the user clenches his hand, a pointing move in which the user motions to move the indicated cursor by hand, a slap in which the user moves his hand to one direction above a predetermined speed, a shake in which the user waves his hand left/right or up/down, and a rotation in which the user rotates his hand. The technical concept of an embodiment may be applicable to motions other than those explained above. By way of example, the user's motion may additionally include a spread motion in which the user unfolds his clenched hand.

The controller 140 determines if the object escapes a predetermined area (e.g., 40 cm×40 cm square) within a predetermined time (e.g., 800 ms) to thus determine whether the user's motion is the pointing move or the slap. If the object doesn't escape the predetermined area within the predetermined time, the controller 140 may determine the user's motion to be the pointing move. If the object escapes the predetermined area within the predetermined time, the controller 140 may determine the user's motion to be the slap. In another example, if it is determined that the speed of the object is below a preset speed (e.g., 30 cm/s), the controller may determine the user's motion to be the pointing move. If it is determined that the speed of the object exceeds the preset speed, the controller 140 determines the user's motion to be the slap.

As explained above, the controller 140 performs tasks of the display apparatus 100 using the recognized voice and motion. The task of the display apparatus 100 may include at least one of: power control, channel change, volume adjustment, content (e.g., video, music, photo, etc.) playback, selecting of GUI (Graphical User Interface) displayed on screen, or internet service (for example, search, browsing), which may be performed by the display apparatus 100.

The method by the controller 140 controlling the display apparatus 100 will be explained in more detail hereinafter.

Figure 2:
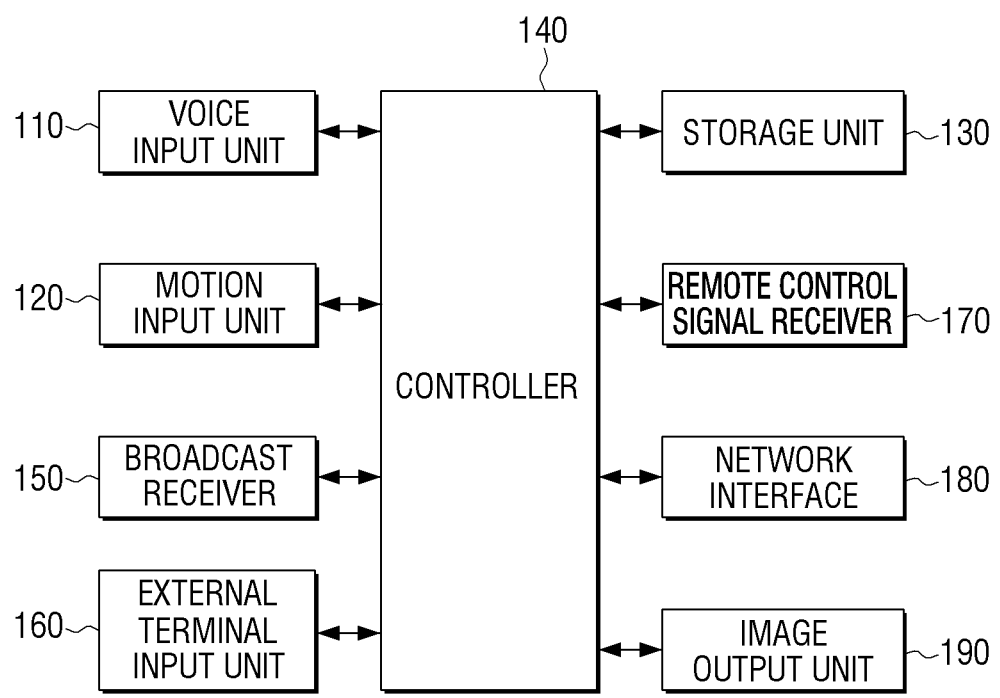

FIG. 2 is a block diagram of the display apparatus 100 according to another embodiment. Referring to FIG. 2, the display apparatus 100 may include a voice input unit 110, a motion input unit 120, a storage unit 130, a controller 140, a broadcast receiver 150, an external terminal input unit 160, a remote control signal receiver 170, a network interface 180, and an image output unit 190. Referring to FIG. 2, the display apparatus 100 may be implemented as a set-top box or smart TV.

Meanwhile, since the voice input unit 110, the motion input unit 120, the storage unit 130, and the controller 140 have been explained above with reference to FIG. 1, repetitive explanation thereof will be omitted for the sake of brevity.

The broadcast receiver 150 receives a broadcast signal from outside in wired or wireless manner. The broadcast signal may include video, audio and additional data (e.g., EPG). The broadcast receiver 150 may receive the broadcast signal from a variety of sources including terrestrial broadcasting, cable broadcasting, satellite broadcasting, or internet broadcasting.

The external terminal input unit 160 may receive image data (e.g., video, photo, etc.) or audio data (e.g., music, etc) from outside the display apparatus 100. The external terminal input unit 160 may include at least one of High-Definition Multimedia Interface (HDMI) input 161, component input 162, PC input 163, or USB input 164. The remote control signal receiver 170 may receive a remote control signal from outside the remote control. The remote control signal receiver 170 may receive the remote control signal when the display apparatus 100 is in voice task mode or motion task mode.

The network interface 180 may connect the display apparatus 100 to an external device (e.g., server, other display apparatuses etc.) under control by the controller 140. The controller 140 may download an application from the external device connected via the network interface 180 or control so that an internet service such as web browsing is provided to the user, and may control to receive image data, audio data, text data etc. from the external device. The network interface 180 may be embodied as wired/wireless communication interface, and may be embodied as various types of bilateral communication interface. For example, the network interface 180 may provide at least one of Ethernet 181, wireless LAN 182, and Bluetooth 183.

The image output unit 190 may output external broadcast signal received through the broadcast receiver 150, or image data input at the external terminal input unit 160, or image data stored at the storage unit 130 to an external display apparatus (e.g., monitor, TV, speaker etc.). Furthermore, if the display apparatus 100 has a display or speaker, the image output unit 190 may output such data through the display or speaker of the display apparatus 100.

Figure 3:
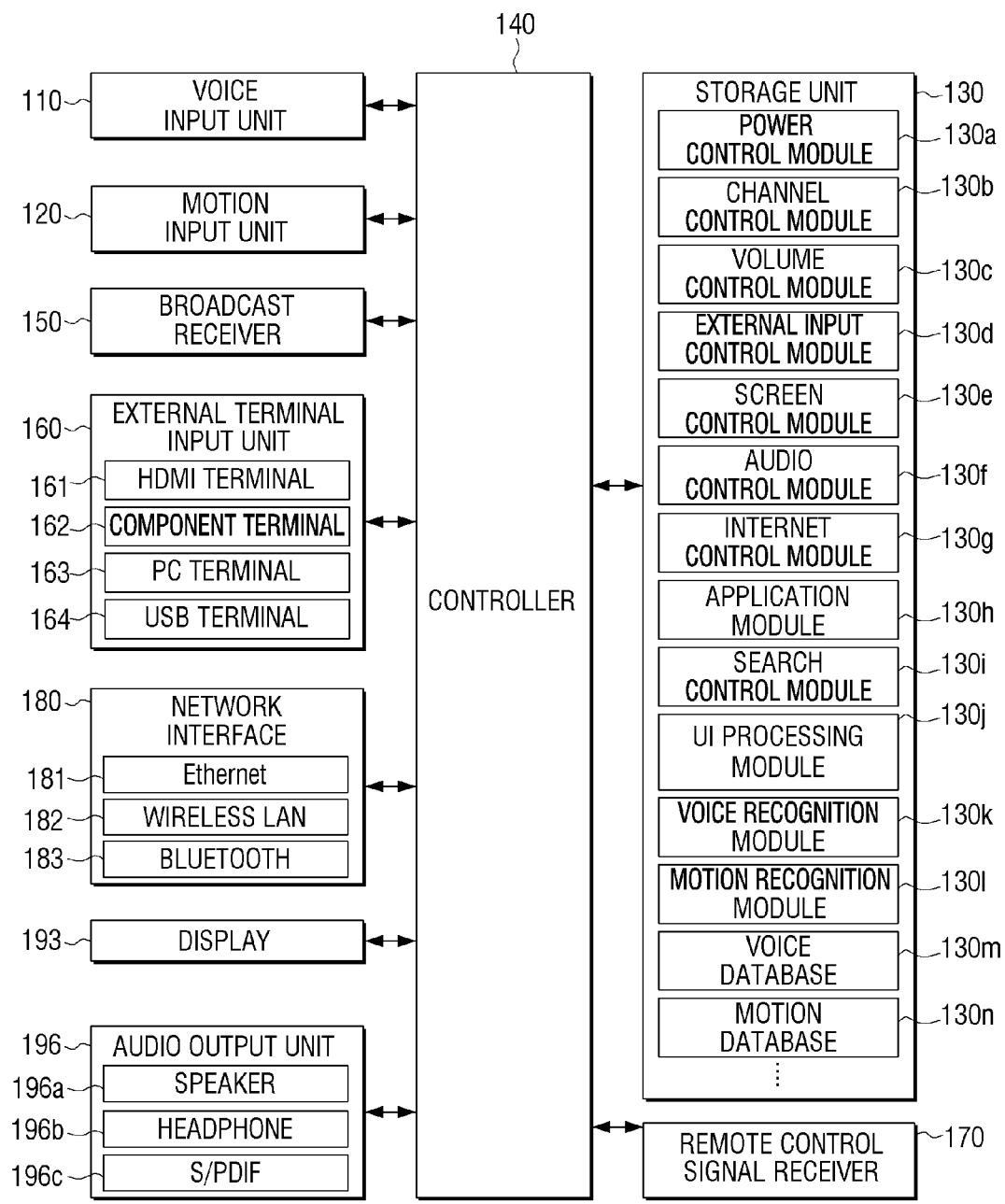

FIG. 3 is a block diagram of the display apparatus 100 according to another embodiment. Referring to FIG. 3, the display apparatus 100 may include a voice input unit 110, a motion input unit 120, a storage unit 130, a controller 140, a broadcast receiver 150, an external terminal input unit 160, a remote control signal receiver 170, a network interface 180, a display 193 and an audio output unit 196. The display apparatus 100 may be a digital TV, but not limited thereto.

Since the voice input unit 110, the motion input unit 120, the storage unit 130, the controller 140, the broadcast receiver 150, the external terminal input unit 160, the remote control signal receiver 170, the network interface 180, the display 193 are identical to those with the same reference numerals explained above with reference to FIGS. 1 and 2, the detailed explanation thereof will be omitted for the sake of brevity.

The audio output unit 196 outputs voice corresponding to the broadcast signal, under control of the controller 140. The audio output unit 196 may include at least one of a speaker 196a, a headphone output terminal 196b or S/PDIF output terminal 196c.

Meanwhile, referring to FIG. 3, the storage unit 130 may include a power control module 130a, a channel control module 130b, a volume control module 130c, an external input control module 130d, a screen control module 130e, an audio control module 130f, an internet control module 130g, an application module 130h, a search control module 130i, a UI processing module 130j, a voice recognition module 130k, a motion recognition module 130l, a voice database 130m, and a motion database 130n. The modules 130a to 130n may be implemented as software to perform the functions of power control, channel control, volume control, external input control, screen control, audio control, internet control, application execution, search control, or UI processing. The controller 140 may perform a corresponding function by executing the software stored at the storage unit 130.

As aforementioned, each control module 130a to 130n may be embodied as software stored in the storage unit 130, but may be embodied through separate hardware.

Hereinbelow are explanations on various exemplary embodiments of the present disclosure with reference to the figures.

With reference to FIGS. 4 to 8, hereinbelow are explanations on an exemplary embodiment of providing different voice guide information or motion guide information according to the connected external device.

The controller 140 displays first voice guide information which guides a voice command for controlling the display apparatus 100 in the voice task mode on the display 193. Herein, the voice task mode is a mode which starts when a voice start command is input and where the display apparatus 100 is controlled by the voice command input thereafter. In addition, the voice task mode may be a mode where the display apparatus 100 is controlled by the voice command input without the voice start command. In this case, it is possible to use a different type of user command for starting the voice task mode instead of the voice start command. The different type of user command may include an input of a particular button, an input of a particular button of an display apparatus 100, and a particular motion of the user.

In addition, when a user command for controlling an external device connected to the display apparatus 100 is input, the controller 140 controls the display 193 to change the first voice guide information to second voice guide information which guides user voice for controlling the external device and to display the second guide information. Specifically, a plurality of voice guide information may be stored at the storage unit 130, and the controller 140 may search the plurality of voice guide information and read out the second voice guide information corresponding to the external device, and display the read second voice guide information on the display 193. Each of the plurality of voice guide information corresponds to the display apparatus 100 and the plurality of external devices connected to the electronic device 100. If the voice guide information on the external device that the user intends to control is not stored in the storage unit 130, the plurality of voice guide information may be received through the external terminal input unit 160 and network interface 180.

Herein, the first and second voice guide information may include different voice commands. By way of example, if the display apparatus 100 is TV, the first voice guide information may include a voice command regarding power control, a voice command regarding executing an external device, a voice command regarding channel setting, or a voice command regarding volume setting. If the external device is one of DVD player and BD player, the second voice guide information may include a voice command regarding power control, a voice command regarding executing an external device, or a voice command regarding playback setting.

Specifically, if the first voice guide information is displayed, and if the voice command included in the first voice guide information is input through the voice input unit 110, the controller 140 directly controls the display apparatus 100 in accordance with the voice command.

However, if the second voice guide information is displayed and if the voice command included in the second voice guide information is input through the voice input unit 110, the controller 140 may generate a control signal corresponding to the input voice command and transmit the generated control signal to the external device via an external terminal input unit 160.

If the display apparatus 100 is connected to the external device through a relay device, and if the voice command included in the second voice guide information is input through the voice input unit 110, the controller 140 may generate a control signal corresponding to the input voice command and transmit the generated control signal to the external device through the relay device. Herein, the relay device and display apparatus 100 may communicate with each other through the network interface 180, and the relay device and the external device may communicate through the wireless communication interface. In this case, the generated control signal may be transmitted to the relay device from the display apparatus 100 through the Bluetooth communication, and the relay device may be embodied to convert the transmitted control signal to IR (Infrared) signal and transmit the control signal to the external device. The generated control signal may be transmitted to the relay device by Bluetooth communication, and the relay device may convert the transmitted control signal into IR signal and transmit the control signal to the external device. The wireless communication interface used for the communication between the relay device and external device may include an RF communication interface besides the IR communication interface, and an NFC (near field communication) communication interface, Zigbe communication interface and Bluetooth communication interface etc may be used as the RF (Radio Frequency) communication interface. The interface between the relay device and display apparatus 100 and the interface between the relay device and external device are not limited to the abovementioned interface, and thus may be embodied as a wired/wireless communication interface, and various types of two way communication interfaces. In a case using an interface used in remote controlling of an external device for communication between the relay device and external device, it is easy to embody so that the external device is controlled through a voice command or user motion input through the display apparatus 100.

Hereinbelow, various embodiments will be explained in detail with reference to FIGS. 4 to 7.

The controller 140 receives a broadcast signal from an external broadcast station via the broadcast receiver 150, and performs signal-processing on the received broadcast signal. In addition, referring to FIG. 4, the controller 140 then displays the signal-processed broadcast image 400 on the display 193, and outputs sound of the signal-processed broadcast signal through the audio output unit 196.

In addition, if the voice start command is input through the voice input unit 110, the controller 140 recognizes the voice start command and converts it into a voice task mode. Herein, the voice start command is a user command for starting the voice task mode, and the voice task mode is a mode where the display apparatus 100 is controlled by the voice command input to the voice input unit 110. As aforementioned, it is possible to use a different kind of user command for starting the voice task mode instead of the voice start command. The different kind of user command may include an input of a particular button of a remote control, an input of a particular button of the display apparatus 100, and a particular motion of the user.

Figure 5:
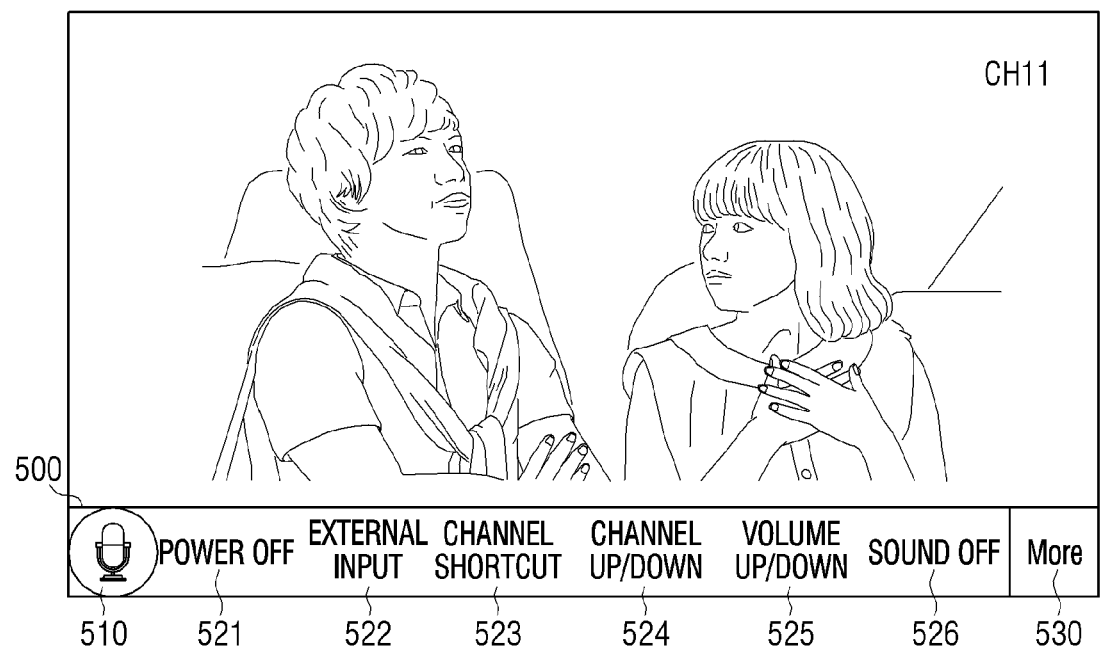

In addition, when the conversion is made into the voice task mode, the controller 140 displays the first guide information 500 for performing the voice task mode as illustrated in FIG. 5. Herein, the first voice guide information 500 is displayed on a lower end of a screen on which a broadcast image is displayed. In addition, the first voice guide information 500 includes an icon 510 which acknowledges that a current mode of a display apparatus is a first voice task mode and a plurality of voice commands 521 through 526, 530 which guide voice command to the user. The location where the voice guide information is displayed may be changed, and the locations where the icon 500 inside the voice guide information and the plurality of voice commands 521 to 526, 530 are displayed can also be changed.

The plurality of voice commands include a power off voice command 521, an external input voice command 522, a channel shortcut voice command 523, a channel up/down voice command 524, a volume up/down voice command 525, a sound off voice command 526, and a MORE voice command 530. The MORE voice command 530 is a command which is to show more voice commands besides displayed voice commands. However, the voice commands included in the first voice guide information 500 are merely exemplary embodiments, and thus other voice commands (for example, a channel list voice command etc.) may be included.

Figure 6:
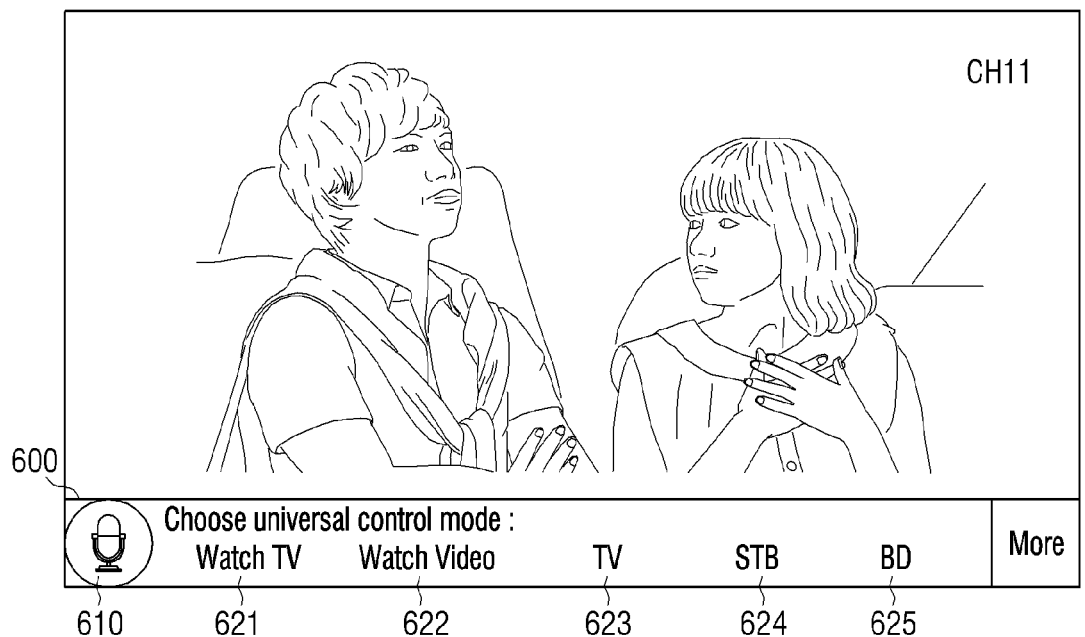

With the first voice guide information 500 displayed, if the user voice "Universal Control" is input to the voice input unit 110, the controller 140 displays third sound guide information 600 which may select the external device to be controlled as illustrated in FIG. 6. The third voice guide information 600 may include an icon 610 indicating that the current mode of the display device is voice task mode and a plurality of voice commands 621 to 625, 630 guiding the user voice. The plurality of voice commands may include Watch TV voice command 621, Watch Video voice command 622, TV voice command 623, set-top box (STB) voice command 624, Blu-ray disk player (BD) voice command 624, and MORE voice command 630. However, one will understand that, other than the voice commands of the third voice guide information 600 listed above, the voice commands may include additional voice commands (e.g., DVD player voice command, USB voice command, etc.).

Figure 7:
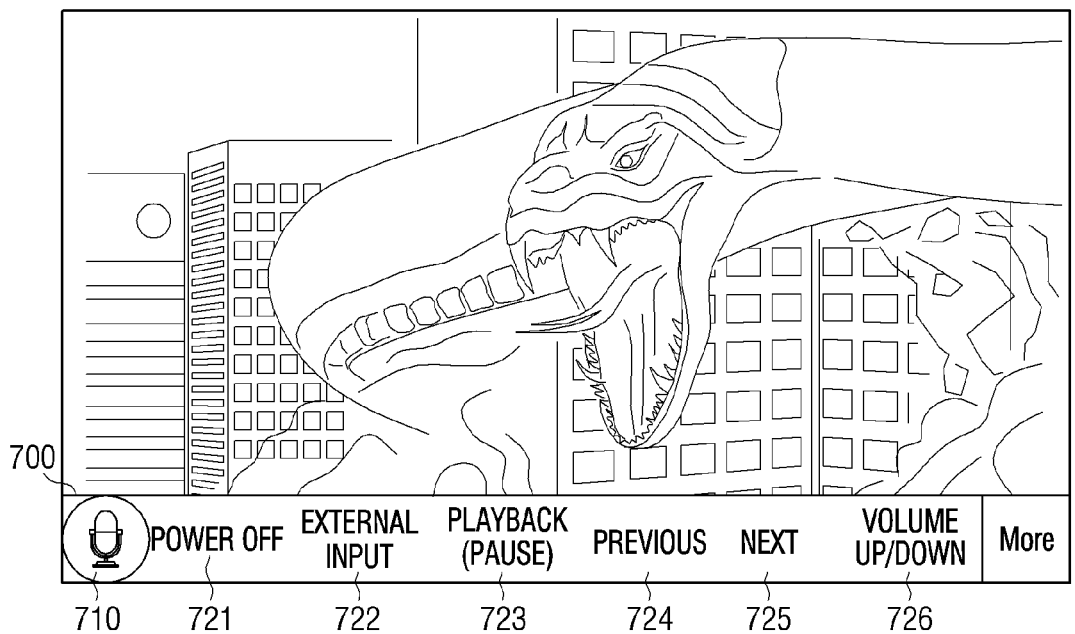

With the third voice guide information displayed, if user voice "BD" is input through the voice input unit 110, the controller 140 may control the BD by using the user voice. The controller 140 then searches the plurality of voice guide information stored in the storage unit 130 for the voice guide information to control the BD, and displays the searched voice guide information as illustrated in FIG. 7.

That is, for the broadcast reception, the controller 140 may display the first voice guide information 500 as illustrated in FIG. 5. However, when the external device to be controlled is selected, the controller 140 changes the displayed voice guide information to the second voice guide information as illustrated in FIG. 7. The second voice guide information 700 includes an icon 710 to indicate that the current mode of the display device is voice task mode, and a plurality of voice commands 721 to 726, 730 to guide the user voice. The plurality of voice command s include a power-off voice command 721, an external input voice command 722, a playback (pause) voice command 723, a previous file voice command 724, a next file voice command 725, or a volume up/down voice command 726. However, the second voice guide information 700 is not limited to the voice commands listed above. Accordingly, the second voice guide information 700 may include additional voice commands (fast-forward voice command, rewind voice command, etc.)

As explained above, since different voice guide information is provided depending on whether or not an external device is connected, and type of the connected external device, the user is able to control the display apparatus more conveniently and efficiently.

Meanwhile, although the embodiment above explains a situation in which the display apparatus 100 is connected to a BD in accordance with the user command using voice recognition, this is written only for illustrative purpose. In another embodiment, the display apparatus 100 may be connected to the BD using an external remote control, or the like. Although it is assumed that different voice guide information is provided in accordance with whether or not an external device is connected and the type of the connected external device, this is written only for illustrative purpose. Accordingly, different motion guide information may be provided in the motion task mode in accordance with whether or not an external device is connected and the type of the connected external device.

Figure 8:
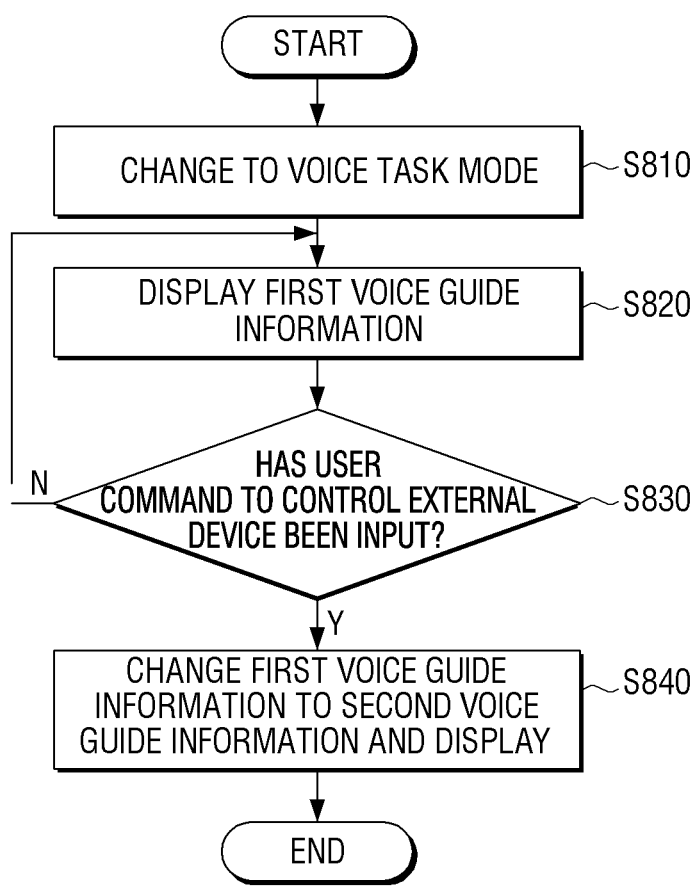
FIG. 8 is a flowchart provided to explain a method for providing different voice guide information depending on an external device connected to the display apparatus, according to an exemplary embodiment.

A control method of an display apparatus will be explained below with reference to FIG. 8 according to an embodiment.

At (S810), the display apparatus 100 changes to the voice task mode. Specifically, if a voice start command is input through the voice input unit 110 of the display apparatus 100, the display apparatus 100 changes the operation mode to the voice task mode in which the display apparatus 100 is controlled in accordance with the user voice.

At (S820), in the voice task mode, the display apparatus 100 displays the first voice guide information. To perform broadcast reception, the display apparatus 100 may include voice commands to control the broadcast reception function. By way of example, the first voice guide information may include a voice command for channel setting.

At (S830), the display apparatus 100 determines if a user command to control external device is input. The user command may be the user voice command as explained above with reference to FIG. 6, or a command issued through the external input change buttons provided on the remote control operated in association with the display apparatus 100.

At (S830-Y), if the user command to control external device is input, at (S840), the display apparatus 100 changes the first voice guide information and thus displays the second voice guide information. If the external device is Blu-ray (BD) player or DVD player, the voice command for channel setting disappears from the second voice guide information, and voice commands for image playback (e.g., voice command to playback/stop, voice command for next file playback, etc.) may appear.

As explained above, since different voice guide information is displayed depending on whether or not an external device is connected and the type of the connected external device, the user is able to control the connected external device using voice recognition more conveniently and intuitively.

Figure 9:
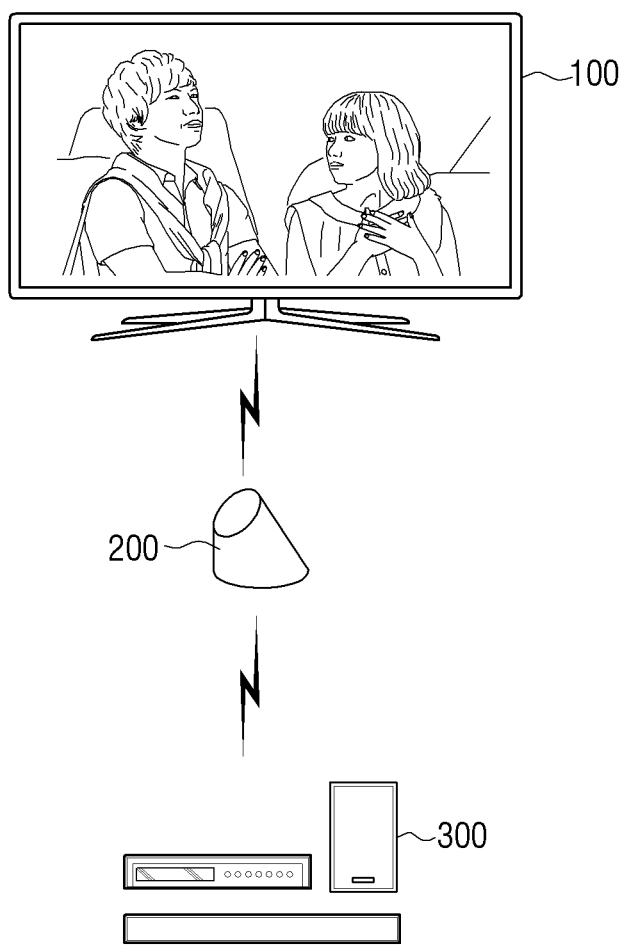
FIG. 9 is a view illustrating a system having an display apparatus, an external device, and a relay device relaying the display apparatus and the external device, according to an exemplary embodiment.

Meanwhile, although the display apparatus 100 is connected directly to the external device through the external terminal input unit 160 in the embodiment explained above, this is written only for illustrative purpose. Accordingly, the technical concept of the embodiment may also be applicable to an example where the display apparatus 100 is connected to the external device using a relay device which is connected via the network interface 180. Specifically, the system 10 illustrated in FIG. 9 may include the display apparatus 100, the relay device 200 and the external device 300, in which the display apparatus 100 may be connected to the external device 300 via the relay device 200.

Specifically, if user voice contained in the second voice guide information is input through the voice input unit 110, the display apparatus 100 generates a control signal corresponding to the user voice as input. The display apparatus 100 then transmits the control signal to the relay device 200 using the Bluetooth communication of the network interface 180. If the control signal is transmitted, the relay device 200 converts the received control signal into IR signal form and transmits the converted signal to the external device 300. On receiving the IR Signal, the external device 300 demodulates the IR signal and is controlled in accordance with the user voice input to the display apparatus 100.

The interface between the relay device and display apparatus 100 and the interface between the relay device and the external device are not limited to the abovementioned interfaces, and thus may be embodied as wired/wireless communication interfaces, and various kinds of two way communication interfaces.

Figure 10:
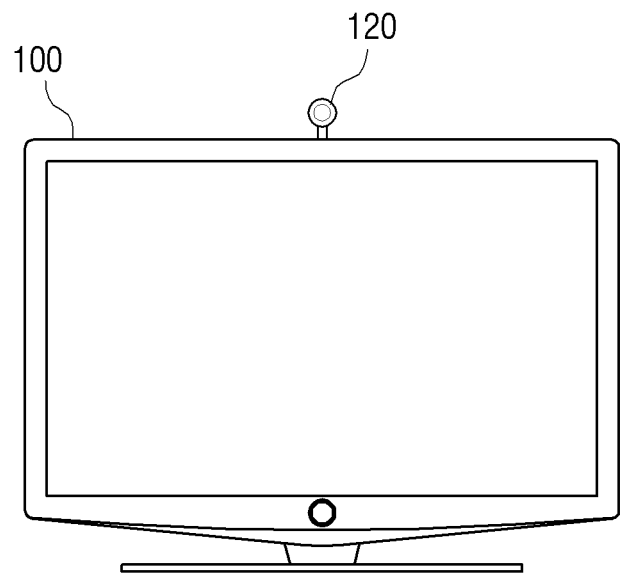
FIG. 10 is a view illustrating a camera provided in an display apparatus, according to an exemplary embodiment.
Figure 11:
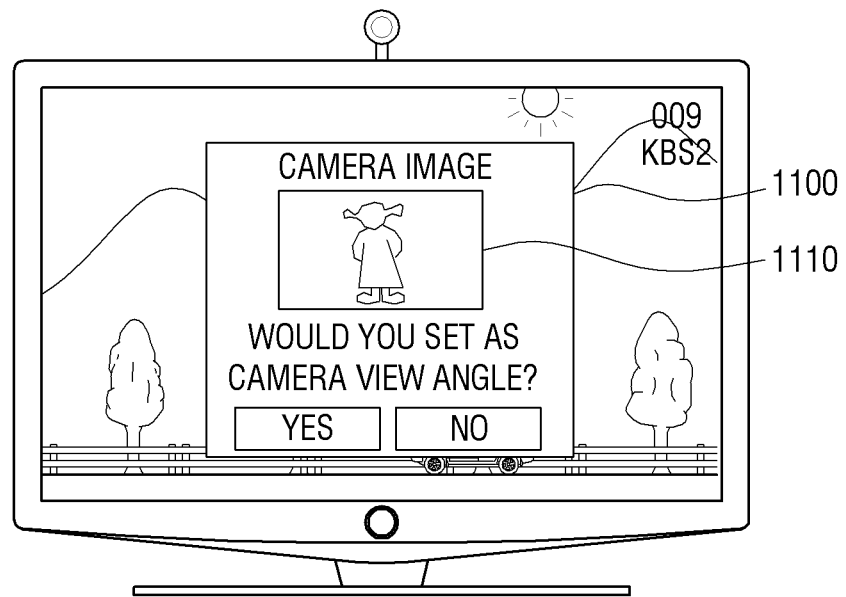
FIG. 11 is a view illustrating a view angle setting UI for setting a view angle of a camera provided in an display apparatus, according to an exemplary embodiment.
Figure 12:
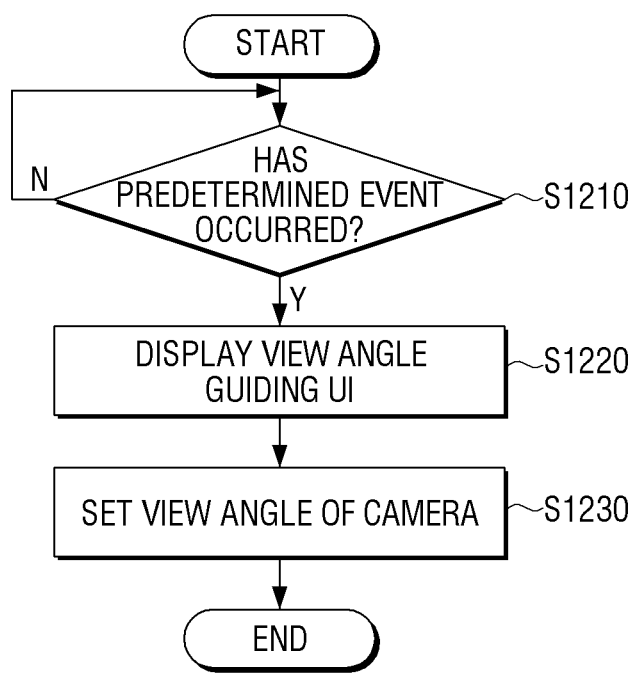
FIG. 12 is a flowchart illustrating a view angle setting method of an display apparatus, according to an exemplary embodiment.

Hereinbelow are exemplary embodiments of a view angle setting UI which sets a view angle of the motion input unit 120, with reference to FIGS. 10 to 12.

The motion input unit 120 may be a camera. Herein, the camera may be placed to project from a bezel on an upper end of among the bezels surrounding the display 193 of the display apparatus 100. However, this is merely an exemplary embodiment, and thus the camera may be placed on the upper bezel without projecting, and a portion of the bezel corresponding to the location of the camera may be made of transparent material or embodied to form a hole. In addition, the camera may be placed anywhere on the four surfaces not only on the upper end of the bezel.

When a predetermined event occurs, the controller 140 displays a view angle guiding UI which guides a view angle of the camera on an area of the display screen. In addition, the controller 140 may set the view angle of the camera according to a user command input using the view angle guiding UI.

Herein, the preset event may be one of an event to which power is applied to the display apparatus 100 when initially installing the display apparatus 100, an event where the motion task mode is turned on, and an event where a view angle menu has been selected of control menus of the display apparatus 100. Meanwhile, when a preset event occurs, as illustrated in FIG. 11, the controller 140 displays the view angle guiding UI 1100 on a central area of the display screen. Herein, the view angle guiding UI 1100 is not displayed on an entirety of the display screen but on an area of the display screen (for example, the central area). Therefore, the user becomes able to continuously view the currently viewing contents images. Of course, the view angle guiding UI 1100 may be embodied to be displayed on the entirety of the screen.

In addition, the view angle guiding UI 1100 includes a camera image display screen 1110 which displays the image which is being photographed by the camera. Therefore, the user may check the image that the camera is currently photographing and receive guidance about the current view angle.

Herein, the view angle guiding UI 1100 may include a camera image display screen 1110 and a guideline which guides a desirable user location. Furthermore, the view angle guiding UI 1100 may include a camera image display screen 1110 and a guideline which guides a desirable camera view angle according to the location of the user on the camera image display screen 1110.

In a case where the camera image display screen 1110 and a guideline which guides the desirable camera view angle are included in the view angle guiding UI 1100, the view angle of the camera may be embodied to be adjusted manually by the user, or automatically. In such a case, as the location of the user changes inside the camera image display screen 1110, the location of the guideline which guides the desirable camera view angle may change.

Herein, the view angle of the camera may be adjusted by adjusting a location or angle of the camera. In addition, adjustments can be made by selecting an image displayed on the camera image display screen 1110 of the images photographed in a state where location or angle are not adjusted, in which case the camera image display screen 1110 is part of the photographed image. When a user command is input through the view angle guiding UI 1100 while the view angle of the camera is being adjusted, the controller 140 may set the image of the camera image display screen 1110 at the point where the user command is input as the image used to recognize the user motion.

In a case where the user adjusts the view angle of the camera using the direction button provided in the remote control, the remote control may generate a signal where the selected direction button information is included and transmit the signal to the display apparatus 100, and the controller 140 may adjust the camera according to the signal transmitted from the remote control.

The view angle guiding UI 1100 as aforementioned may use the user motion to generate an image to recognize the user motion more precisely. FIG. 12 is a flowchart for explaining a method for setting a camera view angle of the display apparatus 100 according to an exemplary embodiment of the present disclosure.

First of all, the display apparatus 100 determines whether or not a predetermined event occurred (S1210). Herein, the predetermined event may be one of an event where power is applied to the display apparatus 100 during the initial installment, an event where the motion task mode is turned on, and an event where the view angle setting menus is selected of among the control menus of the display apparatus 100. That is, the view angle setting UI may not be displayed even when in the motion task mode for controlling the display apparatus 100 in the user mode, and may be displayed only when the predetermined event occurred.

When the predetermined event occurs (S1210-Y), the display apparatus 100 displays the view angle guiding UI for setting the view angle of the camera 120 (S1220). Herein, as illustrated in FIG. 11, the view angle guiding UI 1100 may be displayed on the central area of the display screen, and may include the screen 1110 which displays the image currently photographed by the camera. By this, the user becomes able to set the camera view angle while viewing the contents image currently being output from the display apparatus 100. The view angle guiding UI 1100 may of course be embodied to be displayed on the entire screen area.

In addition, the display apparatus 100 may set the view angle of the camera using the displayed view angle guiding UI (S1230). Herein, in a case where the view angle guiding UI 1100 includes the camera image display screen 1110 and a guideline which guides the desirable camera view angle, the camera view angle may be embodied to be adjusted manually by the user or automatically. In addition, in this case, as the location of the user in the camera image display screen 1110 changes, the location of the guideline which guides the desirable camera view angle may change.

Herein, the camera view angle may be adjusted by adjusting the location and angle of the actual camera. In addition, it may also be adjusted by selecting the image displayed on the camera image display screen 1110 of among the images photographed without the location and angle of the camera adjusted, in which case, the camer image display screen 1110 is a part of the photographed image.

When a user command is input through the view angle guiding UI 1100 while the camera view angle is being adjusted, the display apparatus 100 may set the image of the camera image display screen 1110 at the point when the user command is input as image used to recognize the user motion.

Especially, in a case of the user adjusts the camera view angle using the direction button provided in the remote control, the remote control may generate a signal where the selected direction button information is included to the display apparatus 100, and adjust the camera according to the signal transmitted from the remote control.

Accordingly, the user becomes able to set the view angle of the camera more easily using the view angle guiding UI. In addition, by setting the view angle of the camera every time a predetermined event occurs instead of setting the view angle every time the mode is changed to the motion task mode, the user may reduce the inconvenience of having to set the view angle of the camera every time the mode is converted into the motion task mode.

Hereinafter is an explanation on an exemplary embodiment on a motion UI for controlling the display apparatus 100 by the user motion, with reference to FIGS. 13 to 19.

In particular, if a motion start command is input through the motion input unit 120, the controller 140 changes a mode of the display apparatus 100 to a motion task mode. The motion start command may be a motion of shaking one hand horizontally multiple times. The motion task mode is a mode in which the display apparatus 100 is controlled in accordance with a user motion input through the motion input unit 120. Other kinds of user command for starting the voice task mode may be used instead of the motion start command. Other kinds of user commands may include inputting a particular button of a remote control, inputting a particular button of the display apparatus 100, and particular voice of the user etc.

If the mode is changed to the motion task mode, the controller 140 displays an icon and a pointer on the display 193 to perform the motion task mode. The displayed icon is an icon to control a function of the display apparatus 100. The icon may be displayed on a left area and a right area of a display screen. The pointer may be displayed at a center of the display screen.

If a broadcast signal is output during the conversion to the motion task mode, the controller 140 displays the icons for volume adjustment and channel change. Each icon may be displayed on a left area and right area of the display screen. The volume adjustment icon includes a volume-up icon and volume-down icon, and the channel change icon includes a channel up icon and channel down icon. In addition, the pointer may be displayed on a particular location (for example, central area of the screen) of the display screen.

The controller 140 moves the pointer in accordance with a first motion input through the motion input unit 120. The first user motion may be a spread motion with the user hand unfolded. That is, if the motion of moving one hand being spread is input through the motion input unit 120, the controller 140 may move the pointer in accordance with the movement of the user's hand.

If a second user motion is input through the motion input unit 120 while the pointer is placed on an icon, the controller 140 executes a function corresponding to the icon. The second user motion may be a grab motion of clenching one hand. For example, if a grab motion of the user is input through the motion input unit 120 while the pointer is placed on a volume-up icon, the controller 140 may increase a current volume level by "1".

The controller 140 controls the pointer such that the location of the pointer is not changed and is fixed while the second user motion is input. This is because the location of the pointer may be changed since the second user motion is misrecognized as indicating that the user's hand is moved, and thus the user may not control the display apparatus 100 exactly.

If input of the second user motion is maintained while the pointer is placed on the icon, the controller 140 may execute the function of the icon on which the pointer is placed continuously. For example, if the input of the second user motion is maintained while the pointer is placed on a volume-down icon, the controller 140 may decrease a volume level continuously. At this time, if the input of the second user motion is continuously maintained, the controller 140 may execute the function of the icon on which the pointer is placed more quickly. For example, if the input of the second user motion is maintained while the pointer is placed on the volume-down icon, the controller 140 may decrease the volume level with increasing speed.

If a motion end motion is input through the motion input unit 120, the controller 140 may remove the plurality of icons and the pointer from the display screen of the display 193. The motion end motion and the motion start motion may be the same motion.

The method for controlling the display apparatus 100 using the user motion, the plurality of icons and the pointer will be explained below in detail with reference to FIGS. 13 to 18.

Figure 13:
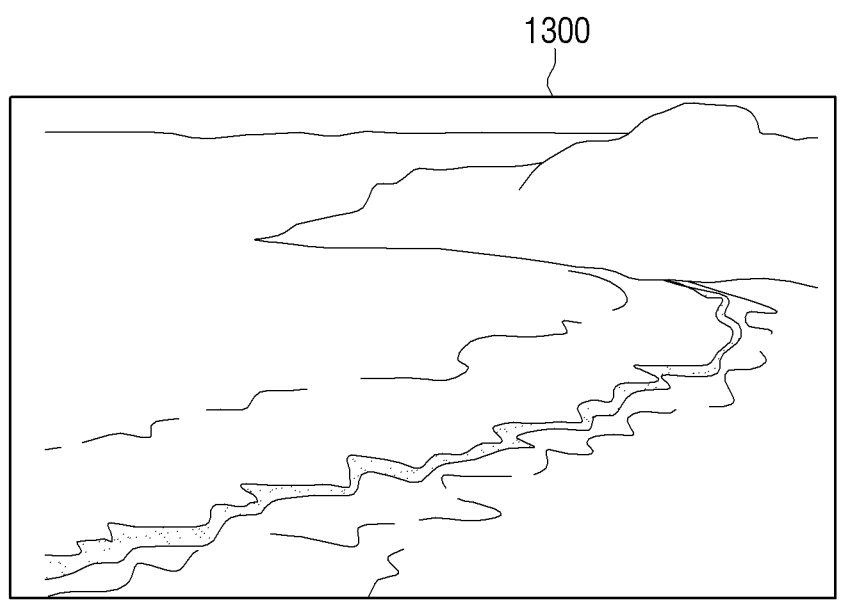
FIGS. 13 to 18 are views illustrating a method of performing channel control and volume control using a user motion, according to various aspects of exemplary embodiments.

The controller 140 signal-processes a broadcast signal which is received through the broadcast receiver 140 and displays a broadcast image 1300 on the display screen as shown in FIG. 13.

If a motion start command is input through the motion input unit 120, the controller 140 changes a mode of the display apparatus 100 to a motion task mode. The motion task mode is a mode in which the display apparatus 100 is controlled in accordance with a user motion input through the motion input unit 120. Other kinds of user command may be used to start the motion task mode instead of the motion start command. Other kinds of user commands may include input of a particular button of the remote control, input of a particular button of the display apparatus 100, and particular voice of the user etc.

Figure 14:
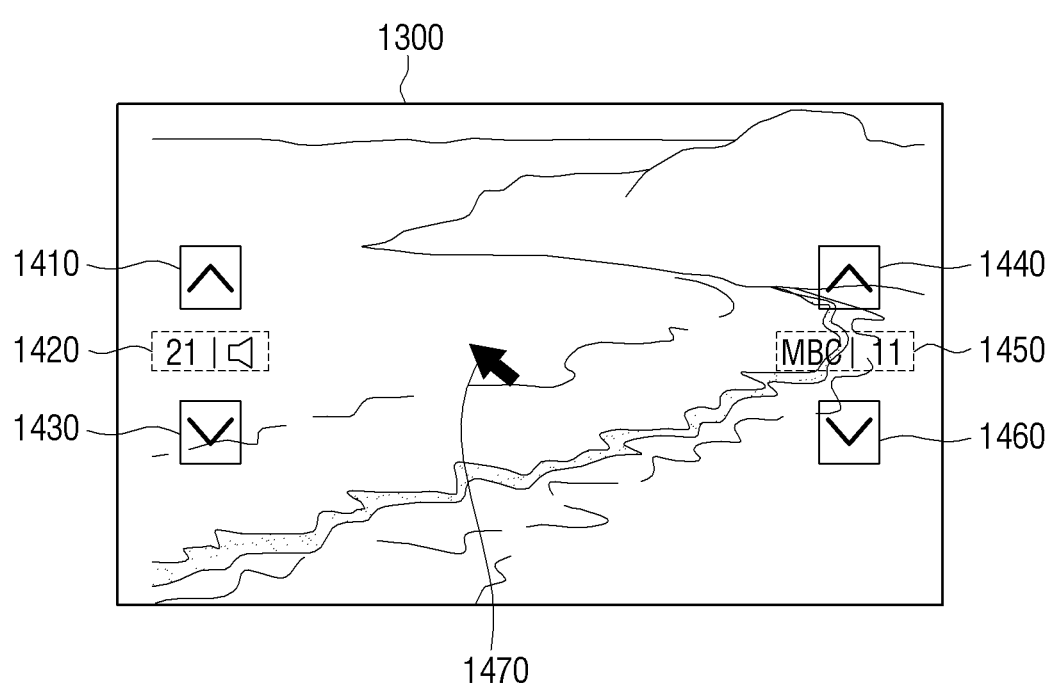

If the mode is changed to the motion task mode, the controller 140 displays a plurality of icons 1410, 1430, 1440, 1460 and a pointer 1470 to perform a specific function of the display apparatus 100. Specifically, as shown in FIG. 14, the controller 140 displays a volume-up icon 1410 and a volume-down icon 1430 on a left area of the display screen to control a volume level, displays a channel-up icon 1440 and a channel-down icon 1460 on a right area of the display screen to control a channel, and displays a pointer 1470 at a center of the display screen.

Volume level information 1420 currently set in the display apparatus 100 is displayed between the volume-up icon 1410 and the volume-down icon 1430. Channel information 1450 (for example, a channel name or a channel number) currently set in the display apparatus 100 is displayed between the channel-up icon 1440 and the channel-down icon 1450. Accordingly, the user can easily check the currently set channel information and the currently set volume level information. The display location of the current volume level information 1420 and the current channel information 1450 may be different from abovementioned locations, and if the mode is changed to the motion task mode, the current volume level information 1420 and channel information 1450 may be displayed right away.

Although the icons 1410 and 1430 for controlling the volume level are displayed on the left area and the icons 1440 and 1460 for controlling the channel are displayed on the right area in the above-exemplary embodiment, this is merely an example. The icons may be displayed on other areas.

Also, although the icons 1410 and 1430 for controlling the volume level and the icons 1440 and 1460 for controlling the channel are displayed, icons for controlling other functions of the display apparatus 100 (for example, mute or power off) may be displayed.

If a motion of moving one hand being spread is input through the motion input unit 120 while the plurality of icons 1410, 1430, 1440, 1460 and the pointer 1470 are displayed, the controller 140 moves the pointer 1470 in accordance with the moving motion.

If a grab motion of the user is input through the motion input unit 120 while the pointer 1470 is placed on one of the plurality of icons 1410, 1430, 1400, 1460, the controller 140 executes a function corresponding to the icon on which the pointer 1470 is placed.

Figure 15:
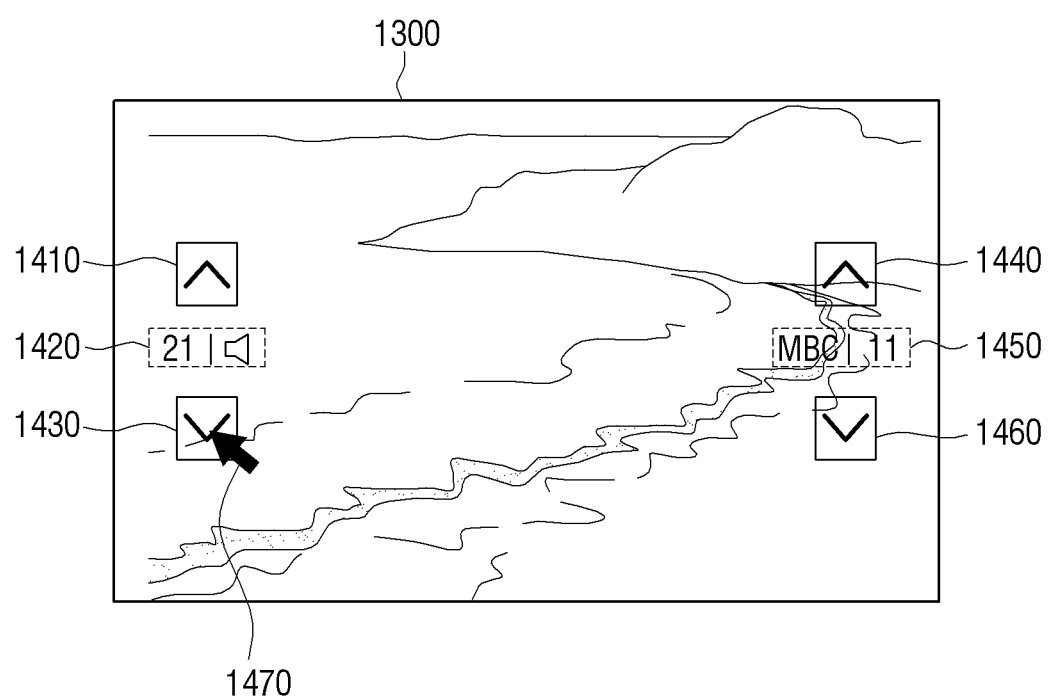
Figure 16:
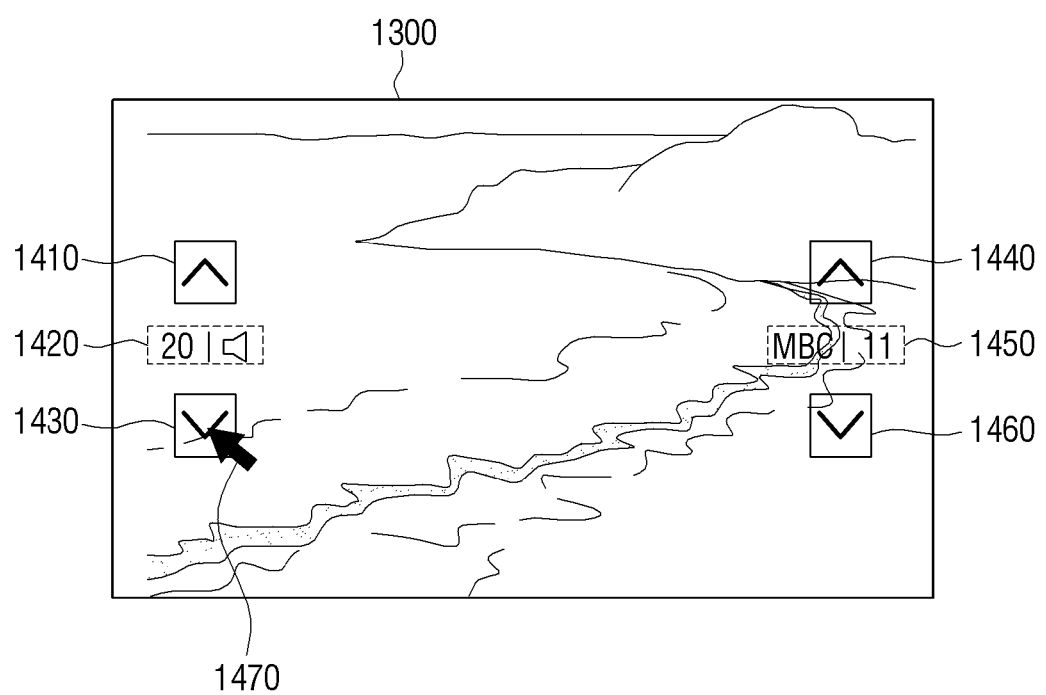

For example, if a motion of moving user's hand being spread to the left is input through the motion input unit 120, the controller 140 moves the pointer 1470 to the left in accordance with the moving motion. If a grab motion of the user is input one time through the motion input unit 120 while the pointer 1470 is placed on the volume-down icon 1430 as shown in FIG. 15, the controller 140 decreases the volume level currently set in the display apparatus 100 by "1". That is, if the volume level currently set in the display apparatus 100 is "21" and the grab motion of the user is input one time through the motion input unit 120 while the pointer 1470 is placed on the volume-down icon 1430, the controller 140 sets the current volume level of the display apparatus 100 to "20". The controller 140 may control the volume level of the display apparatus 100 and may also change the volume level information 1420 as shown in FIG. 7.

Even if the user's hand is moved when the grab motion is input through the motion input unit 120, the controller 140 may fix the location of the pointer 1470 without changing it.

If the grab motion of the user is continuously input through the motion input unit 120 while the pointer 1470 is placed on the volume-down icon 1430, the controller 140 may decrease the current volume level of the display apparatus 100 continuously.

Figure 17:
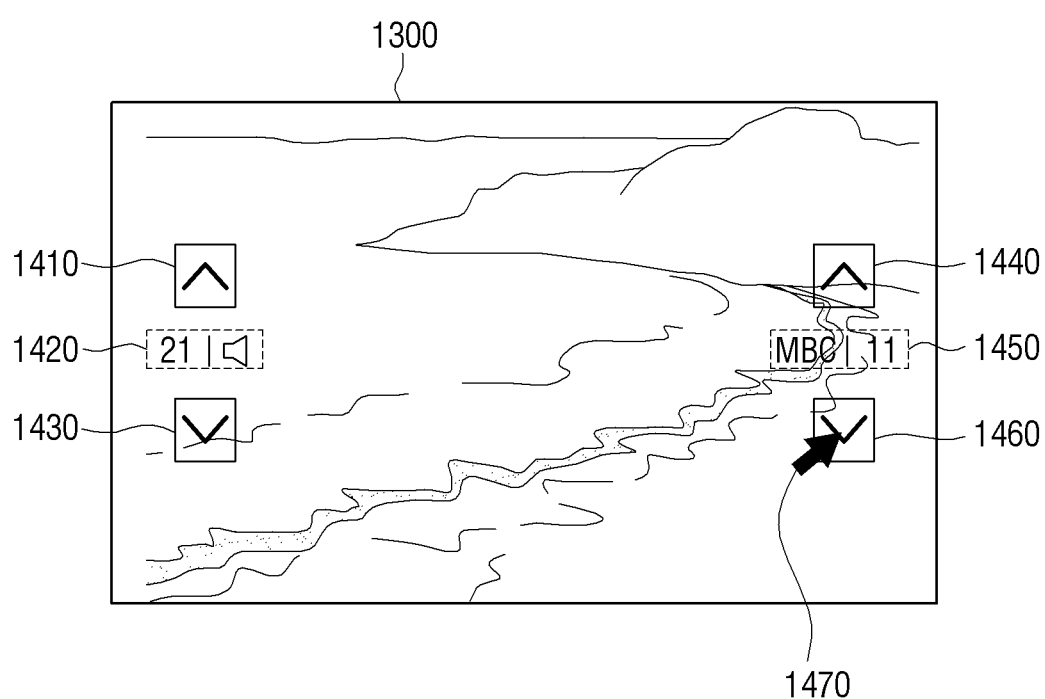
Figure 18:
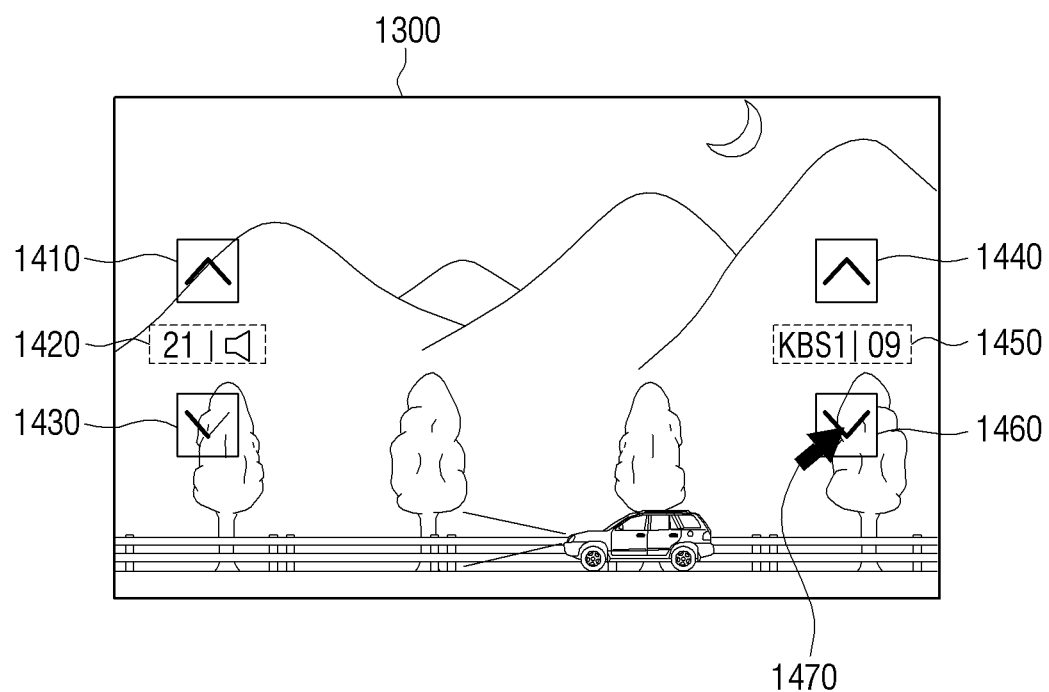

As another example, if a motion of moving user's hand being spread to the right is input through the motion input unit 120, the controller 140 moves the pointer 1470 to the right in accordance with the moving motion. If a grab motion of the user is input two times through the motion input unit 120 while the pointer 1470 is placed on the channel-down icon 1460 as shown in FIG. 17, the controller 140 receives a broadcast image a channel number of which is decreased by "2", and displays the broadcast image. That is, if a channel number currently set in the display apparatus 10 is "11" and the grab motion is input two times through the motion input unit 120 while the pointer 1470 is placed on the channel-down icon 1460, the controller 140 receives a broadcast image of channel number "9" and displays the broadcast image. The controller 140 may control the channel of the display apparatus 100 and may also change the channel information 1450 as shown in FIG. 18.

Also, if the grab motion of the user is continuously input through the motion input unit 120 while the pointer 1470 is placed on the channel-down icon 1460, the controller 140 may decrease the current channel number of the display apparatus 100 continuously.

As described above, the display apparatus 100 allows the user to control the display apparatus using the user motion more easily and intuitively, and to control the functions of the display using only the changes of hand shape and location information of the hand, thereby improving the speed that the user motion is recognized.

Figure 19:
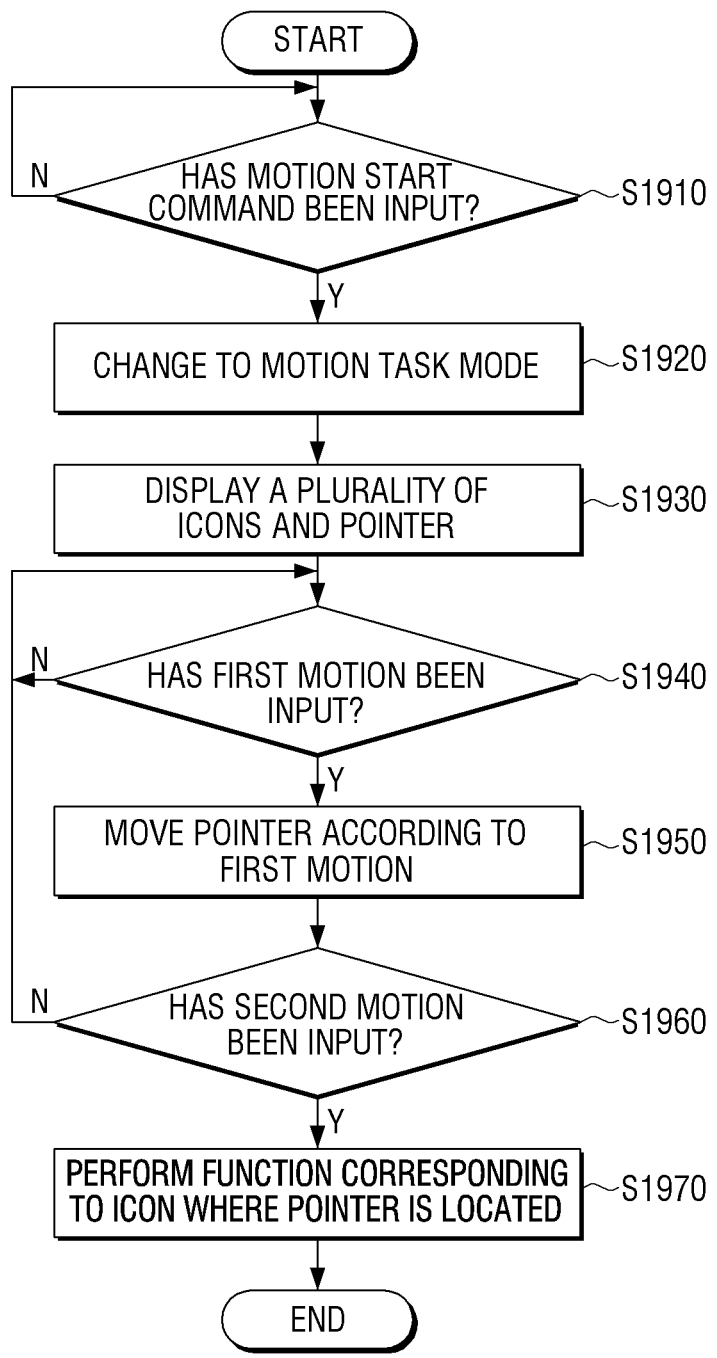
FIG. 19 is a flowchart illustrating a control method of an display apparatus using a user motion, according to an exemplary embodiment.

Hereinafter, a method for controlling the display apparatus 100 using a user motion will be explained with reference to FIG. 19.

The display apparatus 100 determines whether a motion start command is input through the motion input unit 120 or not (S1910). The motion start command may be a motion of shaking user's hand horizontally multiple times. Herein, other kinds of user commands for starting the motion task mode may be used instead of the motion start command. Other kinds of user commands may include an input of a particular button of the remote control, input of a particular button of the display apparatus 100, and particular voice of the user etc.

If the motion start command is input (S1910-Y), the display apparatus 100 changes a mode of the display apparatus 100 to a motion task mode (S1920). The motion task mode is a mode in which the display apparatus 100 is controlled in accordance with a user motion.

If the mode is changed to the motion task mode, the display apparatus 100 displays a plurality of icons and a pointer on the display screen (S1930). The plurality of icons may be displayed on a left area or a right area of the display screen, and the pointer may be displayed at a center of the display screen. The plurality of icons may include an icon for setting a channel and an icon for setting a volume level.

The display apparatus 100 determines whether a first user motion is input through the motion input unit 120 or not (S1940). The user motion may be a motion of moving user's hand being spread.

If it is determined that the first user motion is input (S1940-Y), the display apparatus 100 moves the pointer on the display screen in accordance with the first user motion (S1950).

The display apparatus 100 determines whether a second user motion is input through the motion input unit 120 or not (S1960). The user motion may be a grab motion of clenching user's hand.

If it is determined that the second user motion is input (S1960-Y), the display apparatus 100 executes a function corresponding to an icon on which the pointer is placed (S1970). For example, if the pointer is placed on a volume-up icon and the second user motion is input, the display apparatus 100 increases a volume level currently set in the display apparatus 100. Also, the display apparatus 100 becomes able to execute functions of the icon where the pointer is located according to the number of times the second motion has been input with the pointer located in a particular icon.

Even if the user's hand is moved when the second user motion is input, the display apparatus 100 may fix the pointer without moving the pointer.

According to the method for controlling the display apparatus as described above, the user can control the display apparatus 100 using the user motion more easily and intuitively, and control the functions of the display using only the changes of hand shape and location information of the hand, thereby improving the speed that the user motion is recognized.

Hereinafter, an exemplary embodiment of a method for providing different voice guide information according to voice input methods will be explained with reference to FIGS. 20 to 22.

In particular, if a voice start command is input, the controller 140 determines whether the input voice start command is a first voice start command or a second voice start command. Here, the voice start command refers to a command which is to allow a mode of the display apparatus 100 to enter a voice task mode controlled by the user voice input through the voice input unit 110. In particular, the first voice start command may be user voice command which includes a preset word input through the voice input unit 110 of the display apparatus 100. Also, the second voice start command may be a user command which is to press a preset button of the external apparatus (e.g., the remote control) which operates along with the display apparatus 100. However, the first and second voice start commands are only an exemplary embodiment and thus may be implemented as other types of voice start commands.

If it is determined that the voice start command is the first voice start command, the controller 140 changes the mode of the display apparatus 100 to a first voice task mode. Here, the first voice task mode is a voice task mode controlled according to user voice input through the voice input unit of the display apparatus 100.

If it is determined that the voice start command is the second voice start command, the controller 140 changes the mode of the display apparatus 100 to the second voice task mode. The second voice task mode is a voice task mode controlled according to user voice input into the external apparatus which operates along with the display apparatus 100. In particular, in the second voice task mode, the voice of the user may be input when a voice input button of the external apparatus is pressed. Alternatively, in the second voice task mode, the voice input button of the external apparatus may be pressed and the user voice may be input, and then the voice input button may be pressed once again in order to input the voice of the user.

In particular, in the first voice task mode, the display apparatus 100 may not be controlled by the voice of the user input into the external apparatus. Also, in the second voice task mode, the display apparatus 100 may not be controlled by user voice input into the voice input unit of the display apparatus 100.

If the mode of the display apparatus 100 is changed to the voice task mode, the controller 140 displays voice guide information corresponding to the voice task mode. In particular, if the mode of the display apparatus 100 is changed to the first voice task mode, the controller 140 displays first voice guide information corresponding to the first voice task mode. Also, if the mode of the display apparatus 100 is changed to the second voice task mode, the controller 140 displays second voice guide information corresponding to the second voice task mode.

The first voice guide information and the second voice guide information will be described in more detail with reference to FIGS. 20 and 21.

Figure 20:
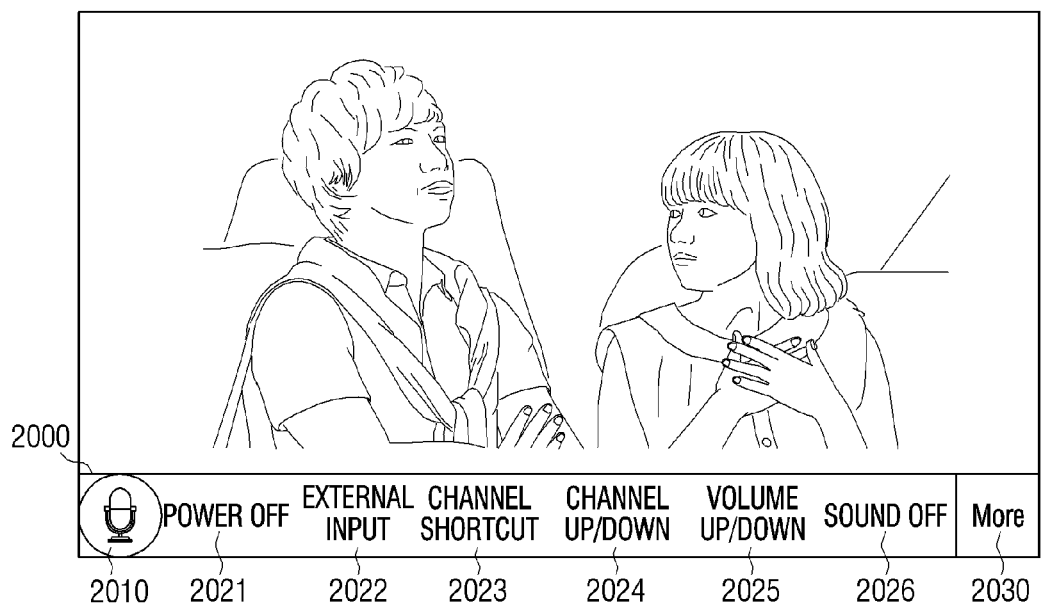
FIG. 20 is a view illustrating first voice guide information which is displayed in a first voice task mode in which user voice is input through a voice input unit of an display apparatus, according to an exemplary embodiment.

FIG. 20 is a view illustrating first voice guide information according to an exemplary embodiment of the present general inventive concept. As shown in FIG. 20, first voice guide information 2000 is displayed in a lower end of a screen on which a broadcast image is displayed. Also, the first voice guide information 2000 includes an icon 2010 which acknowledges that a current mode of a display apparatus is a first voice task mode and a plurality of voice commands 2021 to 2030 which guide voices of a user. The plurality of voice commands include a power off voice command 2021, an external input voice command 2022, a channel shortcut voice command 2023, a channel up/down voice command 2024, a volume up/down voice command 2025, a sound off voice command 2026, and a MORE voice command 2030. The MORE voice command 2030 is a command which is to show more voice commands besides displayed voice commands.

Here, the icon 2010 acknowledging that the current mode of the display apparatus is the first voice task mode may be a microphone shape as shown in FIG. 20.

In particular, the first voice guide information 2000 may include a voice command corresponding to a button of a remote control which may be pressed once to be executed. For example, the first voice guide information 2000 may include the channel up/down voice command 2024, the volume up/down voice command 2025, the sound off voice command 2026, etc.

Figure 21:
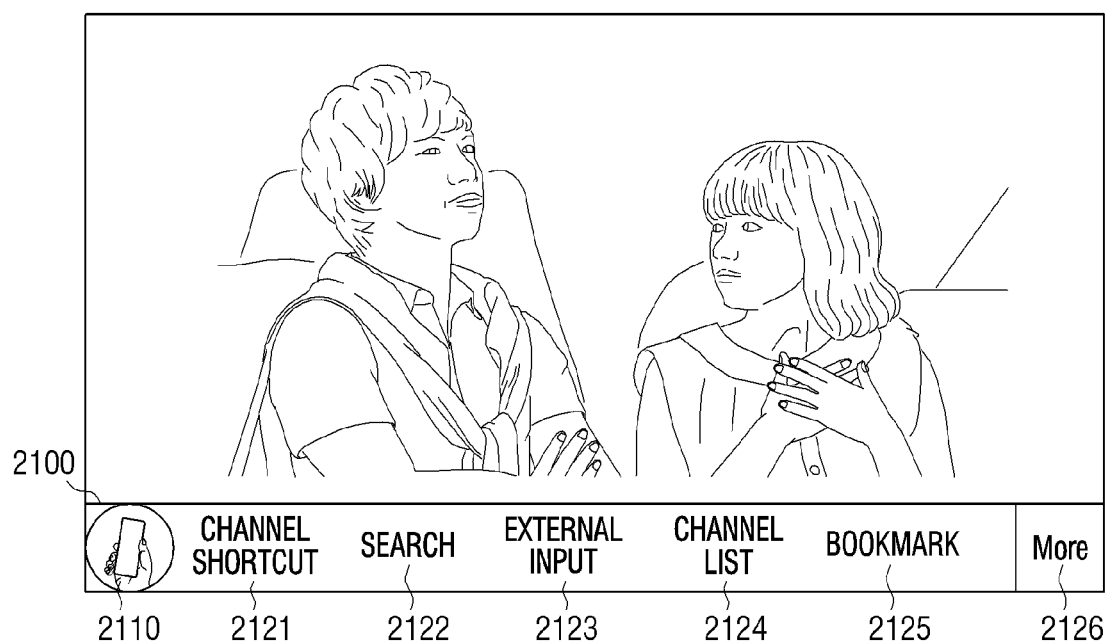
FIG. 21 is a view illustrating second voice guide information which is displayed in a second voice task mode in which user voice is input through a voice input unit of an external device which operates along with an display apparatus, according to an exemplary embodiment.

FIG. 21 is a view illustrating second voice guide information 2100 according to an exemplary embodiment of the present general inventive concept. As shown in FIG. 21, the second voice guide information 2100 is displayed in a lower end of a screen which displays a broadcast image and is the same area as an area displaying the first voice guide information 2000. Also, the second voice guide information 2100 includes an icon 2110 and a plurality of voice commands 2121 through 2126. The icon 2110 acknowledges that a current mode of a display apparatus is a second voice task mode. The plurality of voice commands 2121 through 2126 include a channel shortcut voice command 2121, a search voice command 2122, an external input voice command 2123, a channel list voice command 2124, a bookmark voice command 2125, and a MORE voice command 2126. Here, the bookmark voice command 2125 is a voice command which is to display a menu including a function (e.g., a particular application execution) frequently used by the user.

Here, the icon 2110 acknowledging that the current mode of the display apparatus is the second voice task mode may be a remote control shape which is different from the microphone shape of the icon 2010 shown in FIG. 20. Therefore, the user may check whether a current voice task mode is a first voice task mode or a second voice task mode, through the icons 2010 and 2110 included in the voice guide information 2000 and 2100.

Also, some of the plurality of voice commands of the second voice guide information 2100 may be different from the plurality of voice commands of the first voice guide information 2000. In particular, the second voice guide information 2100 may not include a voice command corresponding to a button of a remote control which may be pressed once to be executed. For example, the second voice guide information 2100 may not include the channel up/down voice command 2024, the volume up/down voice command 2025, the sound off voice command 2026, etc. This is because the user holds the remote control in the second voice task mode and thus it is further convenient for the user to press the button of the remote control rather than to speak.

Instead of this, the second voice guide information 2100 may include voice commands such as the search voice command 2122, the external input voice command 2123, the channel list voice command 2124, and the bookmark voice command 2125 corresponding to functions for which buttons need to be input at least two times in order to enter the function using the remote control buttons.

In other words, as described above, different types of voice guide information may be provided according to first and second voice task modes. Therefore, the user may efficiently and conveniently control the display apparatus 100 according to a plurality of voice task modes.

If one of the first voice guide information 2000 and the second voice guide information 2100 is displayed, the controller 140 controls the display apparatus 100 according to a user input which is input into the voice input unit 110 in a corresponding voice task mode. For example, if user voice "sound off" is input through the voice input unit 110 when the first voice guide information 400 is displayed, the controller 140 may set a volume level of the display apparatus 100 to "0." Also, if user voice "channel list" is input through the voice input unit 110 when the second voice guide information 2100 is displayed, the controller 140 may display a channel list on the display 193.

A method of providing different task modes according to voice input methods will now be described in more detail with reference to the flowchart in FIG. 22.

Figure 22:
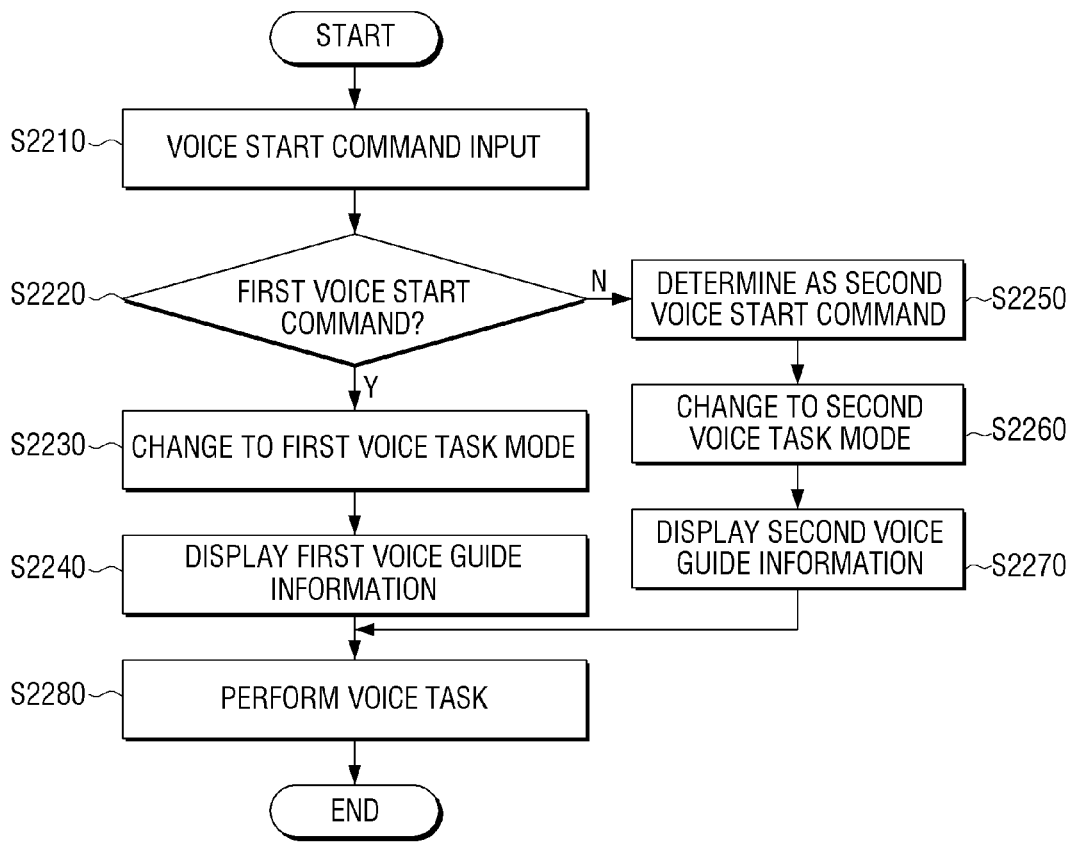
FIG. 22 is a flowchart illustrating a method of providing different voice task modes according to voice input methods, according to an exemplary embodiment.

Referring to FIG. 22, in operation (S2210), the display apparatus 100 receives a voice start command. Here, the voice start command is a command which is to allow a mode of the display apparatus 100 to enter a voice task mode controlled by user voice input through the voice input unit 110. In particular, a first voice start command may be user voice command which includes a preset word input through the voice input unit 110 of the display apparatus 100, and a second voice start command may be a user command which is to press a preset button of an external apparatus (e.g., a remote control) which operates along with the display apparatus 100.

In operation (S2220), the display apparatus 100 determines whether the voice start command is the first voice start command.

If it is determined in operation (S2220-Y) that the voice start command is the first voice start command, the display apparatus 100 changes the mode of the display apparatus 100 to a first voice task mode in operation S2230. Here, the first voice task mode is a mode which is to control the display apparatus 100 according to the user voice input through the voice input unit 110 of the display apparatus 100.

In operation (S2240), the display apparatus 100 displays first voice guide information. Here, the first voice guide information may include an icon acknowledging that a current mode of the display apparatus 100 is the first voice task mode and a plurality of voice commands for performing the first voice task mode. Here, the plurality of voice commands of the first voice guide information may include voice commands, which may immediately execute a function of the display apparatus 100 if a voice of a user is input, such as a channel up/down voice icon, a volume up/down voice icon, and a sound off voice icon.

In operation (S2280), the display apparatus 100 performs a voice task by using the first voice guide information.

If it is determined in operation (S2220-N) that the voice start command is not the first voice start command, the display apparatus 100 determines that the voice start command is a second voice start command in operation (S2250).

In operation (S2260), the display apparatus 100 changes the mode of the display apparatus 100 to a second voice task mode. Here, the second voice task mode is a mode which is to control the display apparatus 100 according to user voice input through the voice input unit 110 of the external apparatus (e.g., the remote control) which operates along with the display apparatus 100. In particular, in the second voice task mode, a preset second button (e.g., a voice input button) of the external apparatus may be pressed and then controlled by user voice input into the external apparatus.

In operation (S2270), the display apparatus 100 displays second voice guide information. Here, the second voice guide information may include an icon acknowledging that the current mode of the display apparatus 100 is the second voice task mode and a plurality of voice commands for performing the second voice task mode. Here, the icon acknowledging that the current mode of the display apparatus 100 is the second voice task mode is different from the icon acknowledging that the current mode of the display apparatus 100 is the first voice task mode. Also, the plurality of voice commands of the second voice guide information may include voice commands having depths such as an external input voice icon, a channel list voice icon, and a bookmark voice icon.

In operation (S2280), the display apparatus 100 performs the voice task by using the second voice guide information.

According to the above-described method of controlling the display apparatus 100, the user may further efficiently control the display apparatus 100 by using different types of voice input methods.

Hereinafter, an exemplary embodiment of a two hands input guide GUI for performing a two hand task mode will be explained with reference to FIGS. 23 to 27.

In particular, if a two hand start command which is to perform the motion task (hereinafter referred to as a two hand task) using the two hands is input, the controller 140 changes a mode of the display apparatus 100 to a two hand task mode which is to perform the motion task using the two hands. Here, the two hand task may be a task of performing a zoom-in or zoom-out of a display screen. Herein, another type of a user command instead of the two hand start command may be used to start the two hand task mode. The another type of the user may include input of a specific button on a remote control, input of a specific button on the display apparatus (100) and a user's specific motion.

In particular, the two hand start command which is to perform the two hand task may be input by sequentially using two hands one by one or by simultaneously using two hands.

In detail, if a motion start command using one hand is input through the motion input unit 120, the controller 140 changes the mode of the display apparatus 100 to the motion task mode which is to perform the motion task using the one hand. Also, if a motion start command using the other hand is input through the motion input unit 120 when the mode of the display apparatus 100 is changed to the motion task mode, the controller 140 may recognize that the two hand start command has been input. The motion start command using the one hand may be a shake motion of shaking one hand to the left and right a plurality of times.

If a shake motion of simultaneously shaking two hands to the left and right a plurality of times is input through the motion input unit 120 in a general control mode which is to control the display apparatus 100, the controller 140 may recognize that the two hand start command has been input.

If the mode of the display apparatus 100 is changed to the two hand task mode, the controller 140 displays a two hand input guide graphical user interface (GUI) which is to perform the two hand task.

In detail, the two hand input guide GUI may be a GUI in a circular shape of which diameter is a straight line connecting the two points corresponding to the locations of two hands. This will be described in detail with reference to FIGS. 23 through 25.

If the two hand start command is input through the motion input unit 120, the controller 140 changes the control mode of the display apparatus 100 to the two hand task mode and displays motion guide information 2300 for performing the motion task mode. Here, the motion guide information 2300 may be displayed only if the motion start command sequentially using the two hands one by one is input but may not displayed if the motion start command simultaneously using the two hands is input.

Figure 23:
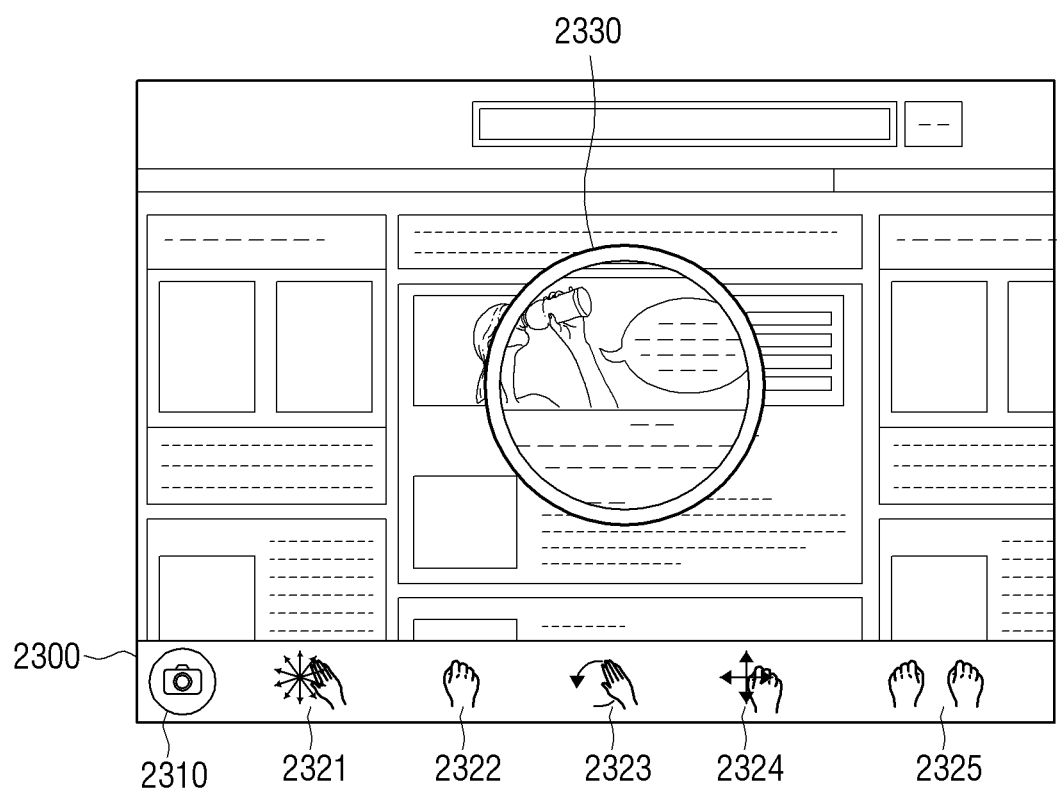
FIGS. 23 to 26 are views illustrating a method of controlling an display apparatus using a user motion using both hands, according to various aspects of exemplary embodiments.

If the two hand start command is input, the controller 140 displays a two hand input guide GUI 2330 which is to perform the two hand task mode. Here, the two hand input guide GUI 2330 may be the circular GUI as shown in FIG. 23. If the GUI may have a different shape if it is a shape which may indicate the locations of both hands of a user intuitively, such as an oval, a triangle, a square and a straight line. Although the location of the two hand input guide GUI 2330 is determined in accordance with the locations of the two hands, but the two hand input guide GUI 2330 may be set to be displayed in the central area of the display screen.

If a motion of moving two hands of a user at a predetermined distance is input through the motion input unit 120, the controller 140 moves the two hand input guide GUI 2330 of the display screen. For example, if a motion of moving the two hands of the user to the right at a predetermined distance is input through the motion input unit 120 when the two hand input guide GUI 2330 is displayed in the central area of the display screen as shown in FIG. 23, the controller 140 moves the two hand input guide GUI 430 to the right as shown in FIG. 24.

If a motion of making the two hands distant from each other is input when the two hand input guide GUI 2330 is displayed in the central area of the display screen, the controller 140 performs a zoom-in based on a determined location in an area where the two hand input guide GUI 2330 is displayed. For example, if the motion of making the two hands distant from each other is input when the two hand input guide GUI 2330 is displayed in a right area of the display screen as shown in FIG. 24, the controller 140 may magnify the display screen based on the determined location in an area where the two hand input guide GUI 2330 is displayed as shown in FIG. 25. Here, the motion of making the two hands distant from each other may be a motion of moving the two hands in a direction which makes the two hands distant from each other or a motion of fixing one hand and moving only the other hand to make the two hands distant from each other.

If a motion of making the two hands close to each other is input when the two hand input guide GUI 2330 is displayed in an area of the display screen, the controller 140 may perform a zoom-out based on the determined location in an area where the two hand input guide GUI 2330 is displayed. Herein, the determined location in an area where the two hand input guide GUI 2330 is displayed may be a center point or a center of gravity for the area where the two hand input guide GUI 2330 is displayed.

Figure 24:
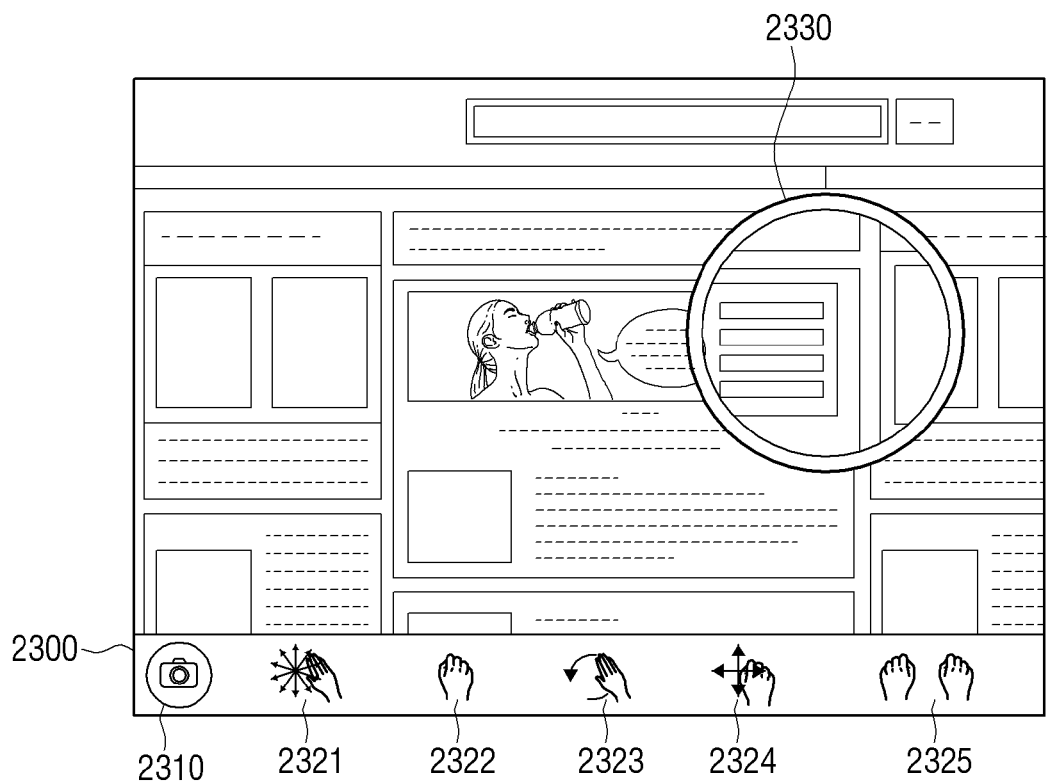
Figure 25:
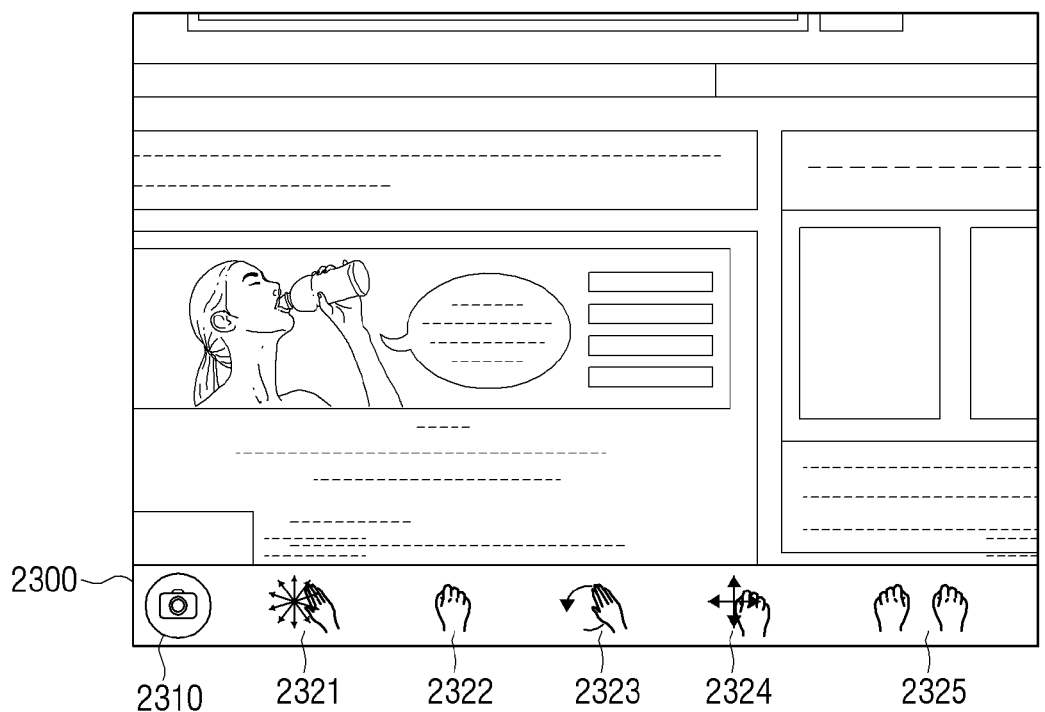
Figure 26:
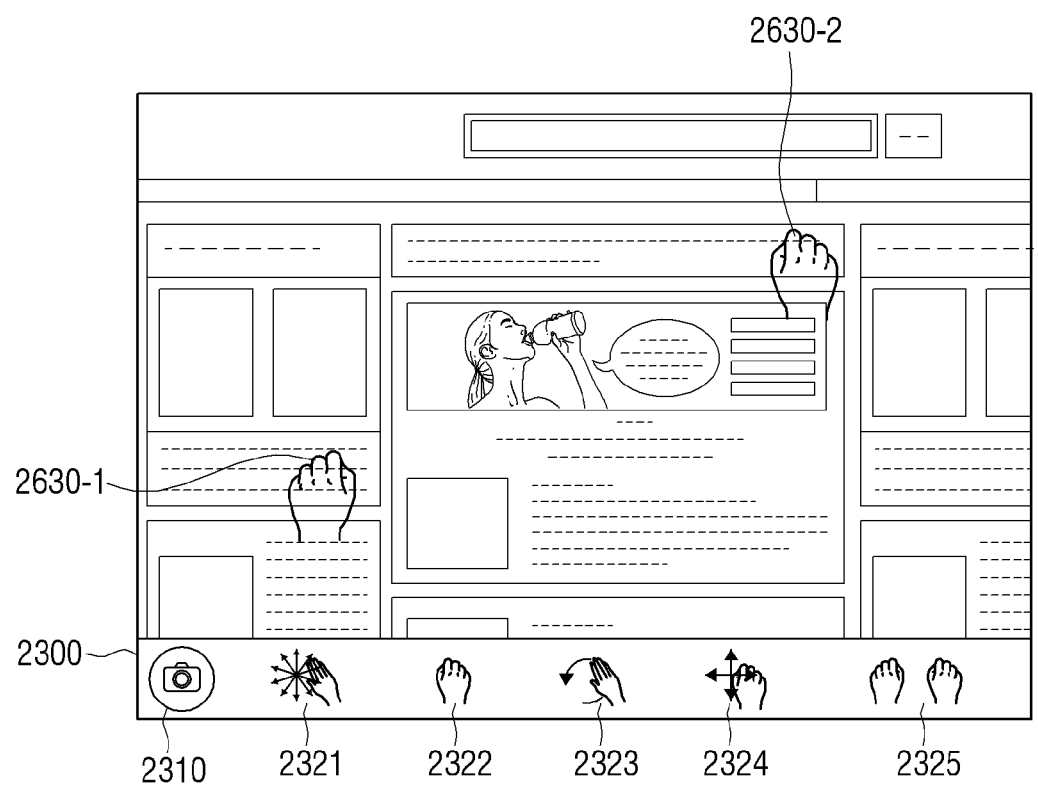

According to another exemplary embodiment of the present general inventive concept, the two hand input guide GUI 2330 may be implemented as two pointer GUIs 2630-1 and 2630-2 as shown in FIG. 26 not a GUI of a circular GUI as shown in FIGS. 23 through 25. Here, each of the two pointers 2630-1 and 2630-2 may be one of a circular shape, an oval shape, a palm shape and an arrow shape but are not limited thereto.

If the motion of making the two hands distant from each other is input when the two pointers 2630-1 and 2630-2 are displayed in areas of the display screen, the controller 140 performs a zoom-in based on the determined locations related to the two pointers 2630-1 and 2630-2. If the motion of making the two hands close to each other is input when the two pointers 2630-1 and 2630-2 are displayed in the areas of the display screen, the controller 140 may perform a zoom-out based on the determined locations related to the two pointers 2630-1 and 2630-2. Herein, the determined locations related to the two pointers 2630-1 and 2630-2 may be a center point connecting with the two pointers, or may be set as a center point or a center of gravity of figures (for example, a circle, an oval, a triangle and a square) comprising outlines including the two pointers. Also, the location of one of the two pointers may be set as a determined location. In this case, the pointer corresponding to the fixed hand from among the two hands corresponding to the two pointers may be a basis, and the display screen may be enlarged or reduced in accordance with a motion of the moving hand.

If the two pointers 2630-1 and 2630-2 are displayed, and one hand is moved, a position of one of the two pointers 2630-1 and 2630-2 corresponding to the moved one hand is moved according to the motion of the one hand. If both of the two hands are moved, the locations of the two pointers are moved. While the locations of the two pointers are moved, the display screen is enlarged or reduced.

As described above, the user may further intuitively and conveniently perform enlargement or reduction of a screen by using two hands, and provide user experience similar to enlargement/reduction of a screen using a multi-touch, which is performed in an display apparatus where a touch input is applicable.

Figure 27:
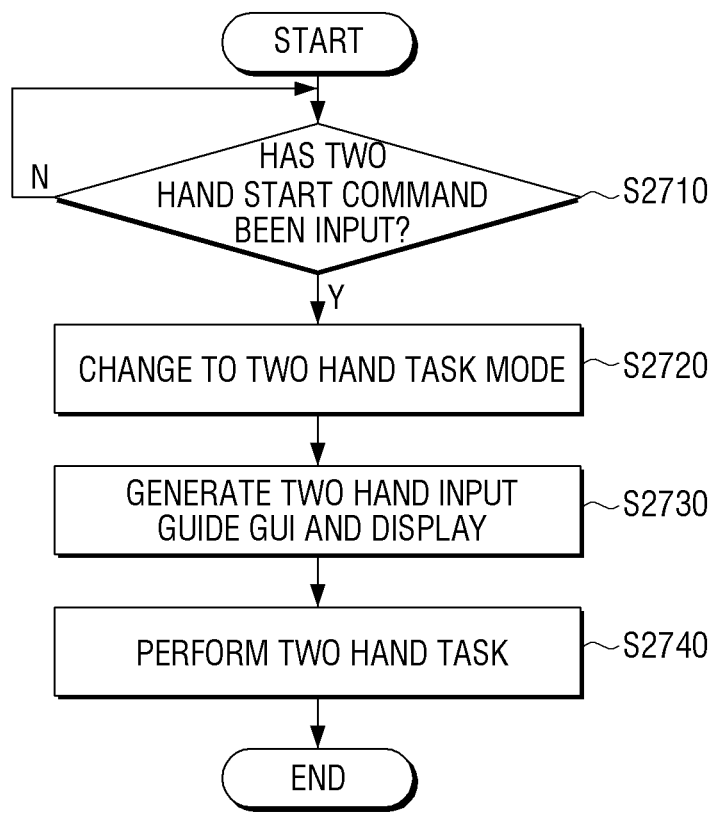
FIG. 27 is a flowchart illustrating a method of controlling an display apparatus using a user motion using both hands, according to an exemplary embodiment.

A method of performing a motion task using two hands will now be described with reference to the flowchart in FIG. 27.

In operation (S2710), the display apparatus 100 determines whether a two hand start command has been input. Here, the two hand start command may be input by sequentially using the two hands one by one or may be input by simultaneously using the two hands.

In detail, if a motion start command using one hand is input through the motion input unit 120, and then a motion start command using the other hand is input, the display apparatus 100 may recognize that the two hand start command has been input. If a shake motion of simultaneously shaking the two hands to the left and right a plurality of times is input through the motion input unit 120, the display apparatus 100 may recognize that the two hand start command has been input.

If it is determined that the two hand start command has been input in operation (S2710-Y), the display apparatus 100 changes a control mode thereof to a two hand task mode in operation (S2720). Here, the two hand task mode may be a mode which is to control the display apparatus 100 by using motions of the two hands, and a two hand task may include a task of enlarging or reducing a display screen.

If the mode of the display apparatus 100 is changed to the two hand task mode, the display apparatus 100 generates and displays a two hand input guide GUI which is to perform the two hand task in operation (S2730). Here, the two hand input guide GUI may be the two hand control GUI 2330 of a circular shape as shown in FIG. 23 or the two pointers 2630-1 and 2630-2 as shown in FIG. 26. However, this is only an exemplary embodiment, and thus another type of two hand control GUI may be displayed in a shape which may indicate the locations of both hands of a user intuitively, such as a shape of oval, triangle, square, and straight line, etc.

In operation (S2740), the display apparatus 100 performs the two hand task by using the two hand input guide GUI.

In detail, if the two hand input guide GUI is the two hand control GUI of a circular shape, and a motion of moving the two hands at a predetermined distance is input through the motion input unit 120, the display apparatus 100 may move the two hand control GUI of a circular shape. If a motion of making the two hands distant from or close to each other is input, the display apparatus 100 may enlarge or reduce a display screen based on a display place of the two hand control GUI of a circular shape.

If the two hand input guide GUI is the two pointers, and a motion of moving one hand is input through the motion input unit 120, the display apparatus 100 moves one of the two pointers corresponding to the moved hand. If the motion of making the two hands distant from or close to each other is input, the display apparatus 100 may enlarge or reduce a display screen based on central places of the two pointers.

According to the above-described various exemplary embodiments of the present general inventive concept, a user may further intuitively and conveniently perform enlargement/reduction of a display screen by using a two hand control GUI, and provide user experience similar to enlargement/reduction of a screen using a multi-touch, which is performed in an display apparatus where a touch input is applicable A method of outputting a feedback message if a voice recognition error occurs when a voice is input will now be described with reference to FIGS. 28 through 33.

In detail, if a voice start command is input, the controller 140 changes a mode of the display apparatus 100 to a voice task mode. Here, the voice task mode is a mode which is to control the display apparatus 100 through user voice input through the voice input unit 110.

As described above, the voice start command may be user voice command (hereinafter referred to as a first voice start command) which includes a preset word input through the voice input unit 110 of the display apparatus 100 or a user command (hereinafter referred to as "a second voice start command") which is to press a preset button of an external apparatus (e.g., a remote control) which operates along with the display apparatus 100. In particular, if the first voice start command is input, the controller 140 changes the mode of the display apparatus 100 to a first voice task mode. Here, the first voice task mode is a voice task mode which is controlled according to user voice input into a voice input unit of the display apparatus 100. If the second voice start command is input, the controller 140 changes the mode of the display apparatus 100 to a second voice task mode. The second voice task mode is a voice task mode which is controlled according to user voice input into the external apparatus which operates along with the display apparatus 100. In particular, in the second voice task mode, a voice of a user may be input when a voice input button of the external apparatus is pressed.

If the mode of the display apparatus 100 is changed to one of the first and second voice task modes, the controller 140 controls the display 193 to display voice guide information which guides user voice for performing a voice task mode. Here, the voice guide information 400 may include a mode guiding icon 2810 which indicates a mode of the current display apparatus and a plurality of voice commands 2821 to 2826 which guide voice of the user. The plurality of voice commands may include a power off voice command 2821, external input voice command 2822, channel shortcut voice command 2823, channel up/down voice command 2824, volume up/down voice command 2825, sound off voice command 2826, and MORE voice command 2830. Herein, the MORE voice command 2830 is a command to see more voice commands other than the displayed voice command.

Furthermore, the mode guiding icon 2810 is different according to the first voice task mode and second voice task mode. For example, the mode guiding icon 2810 in the first voice task mode may include an icon having a microphone shape, and the mode guiding icon 2810 in the second voice task mode may include an icon of a remote control shape.

Figure 28:
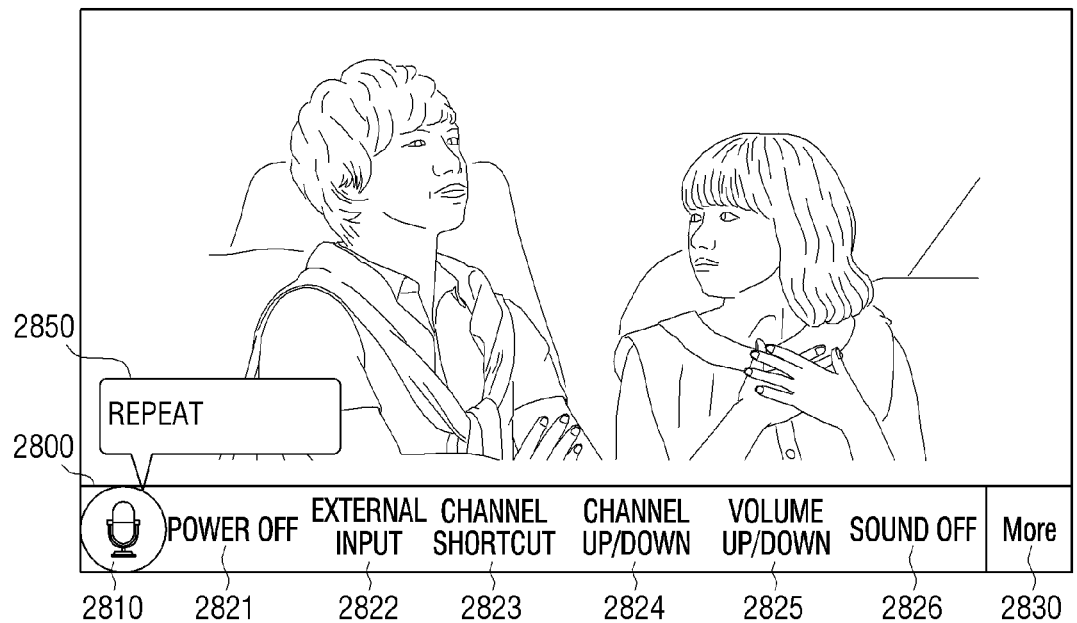
FIG. 28 is a view illustrating a feedback message if a voice recognition error occurs, according to an exemplary embodiment.
Figure 29:
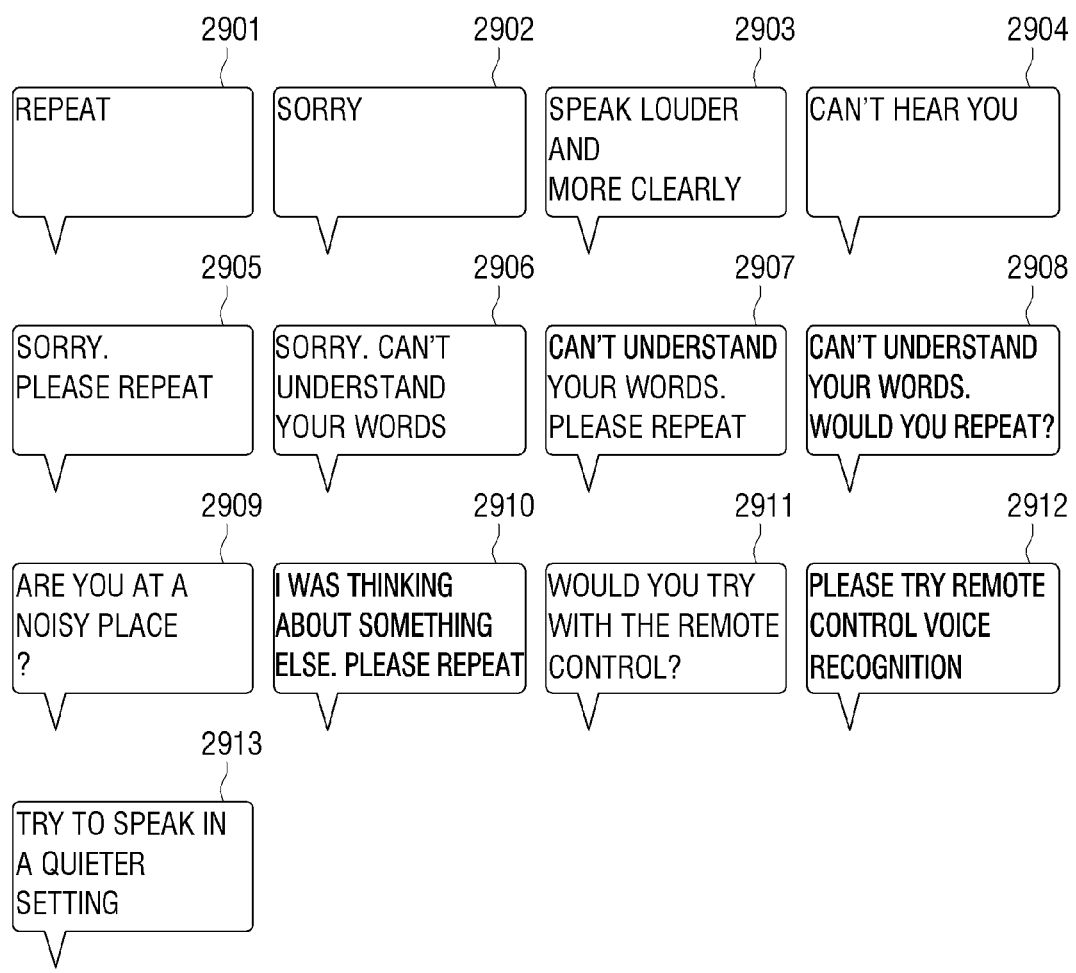
FIGS. 29 to 32 are views illustrating feedback messages which are displayed according to voice task modes and voice error types, according to various aspects of exemplary embodiments.
Figure 30:
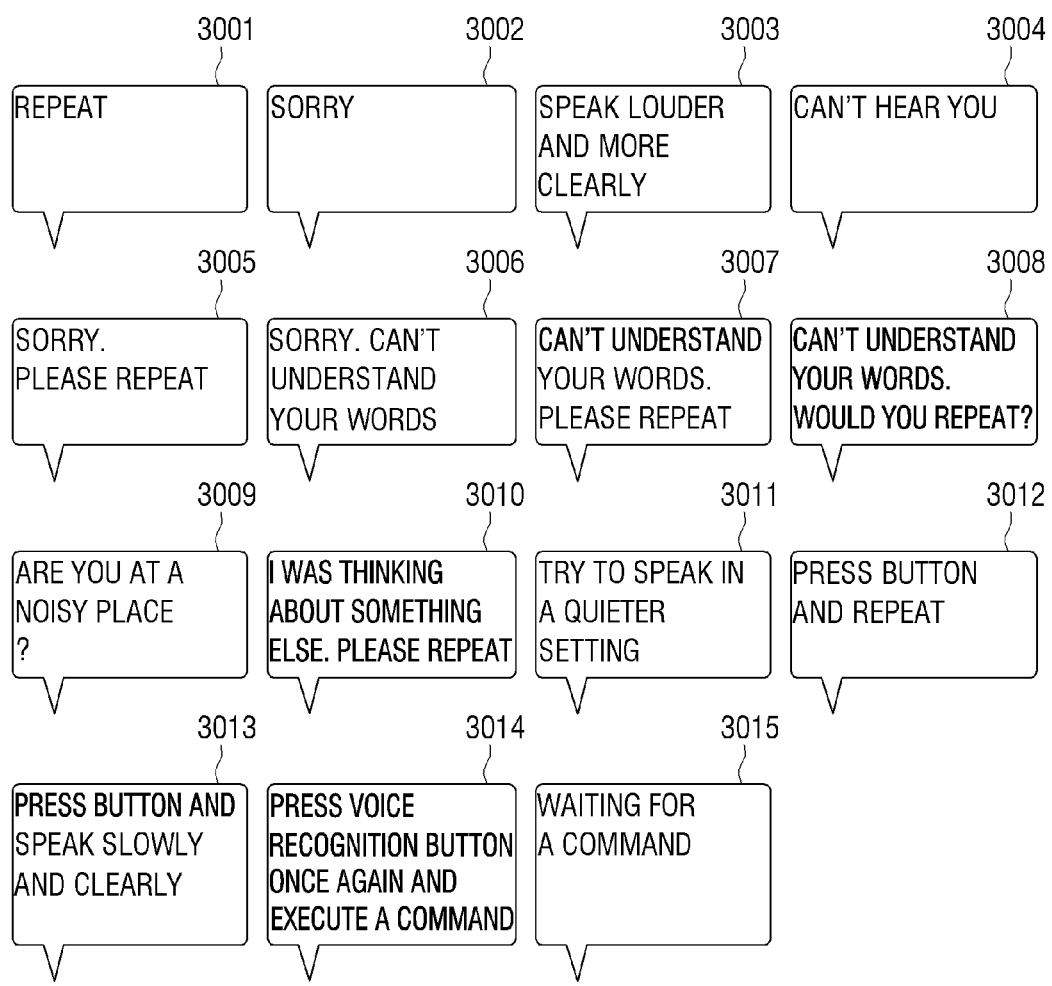
Figure 31:
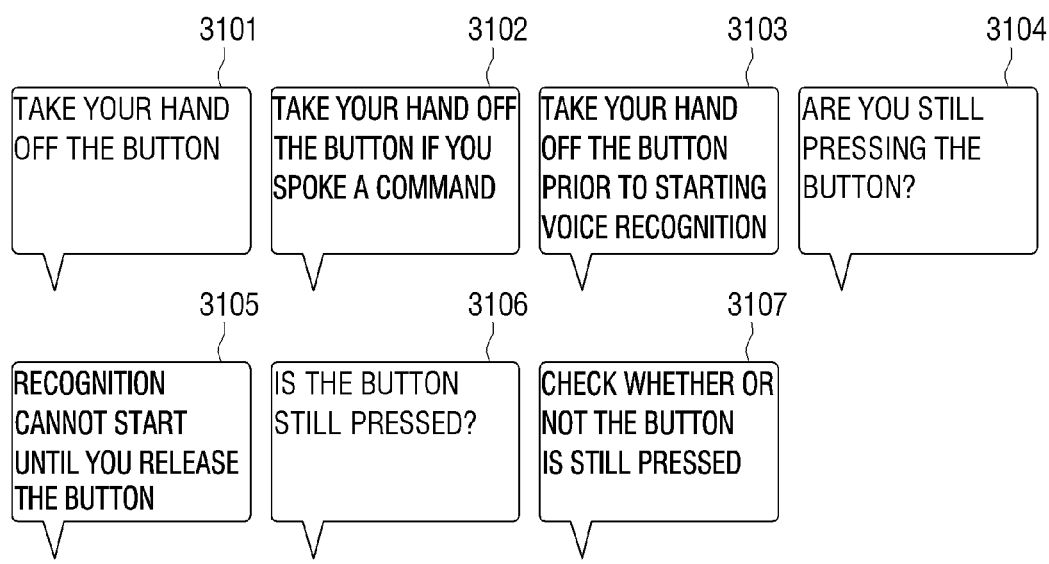
Figure 32:
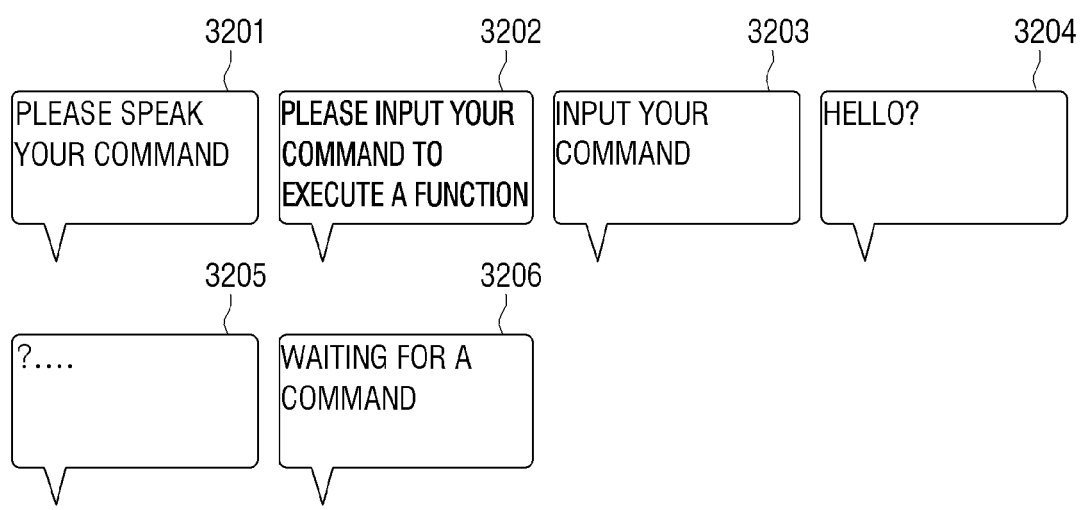

If a voice recognition error occurs when performing a voice task by using the voice guide information 2800, the controller 140 displays one of a plurality of feedback message 2850 which guide the voice recognition error as shown in FIG. 28. Here, the case where the voice recognition error occurs may include at least one of a case where a voice of the user input through the voice input unit 110 is too low, a case where a voice DB does not include a command matching with a recognition result of the voice of the user input through the voice input unit 110, and a case where the user is inexperienced in handling the display apparatus 100.

In particular, the controller 140 may display one of a plurality of feedback messages 2850 stored in the storage unit 130 according to voice task modes and types of voice recognition error.

In detail, the controller 140 may differently display a feedback message according to a case where a voice recognition error occurs in a first voice task mode and a case whether a voice recognition error occurs in a second voice task mode. For example, if the voice recognition error occurs in the first voice task mode, the controller 140 may display one of a plurality of feedback messages 2901 through 2913 shown in FIG. 29. If the voice recognition error occurs in the second voice task mode, the controller 140 may display one of a plurality of feedback messages 3001 through 3015, 3101 through 3107, and 3201 through 3206 shown in FIGS. 30 through 32.

The controller 140 may also differently display the feedback message 450 according to a type of voice recognition error in the second voice task mode. For example, if the voice DB does not include the command matching with the recognition result of the user voice input through the voice input unit 110 or the user voice is not recognized due to a lower voice of the user than a preset value, the controller 140 may display one of the plurality of feedback messages 3001 through 3015 shown in FIG. 30. If a voice input button of an external apparatus is continuously pressed after the user voice is input, the controller 140 may display one of the plurality of feedback messages 3101 through 3107 shown in FIG. 31. If the user voice is not input for a preset time after the voice input button of the external apparatus is pressed, the controller 140 may display one of the plurality of feedback messages 3201 through 3206 shown in FIG. 32.

The controller 140 may also display a feedback message defaulted according to a voice task mode and a type of voice recognition error in a first voice recognition occurrence. For example, if the voice recognition error occurs in the first voice task mode, the controller 140 may display the first feedback message 2901 "Speak once more, please." among the plurality of feedback messages shown in FIG. 29. If the user voice input in the second voice task mode is not recognized, the controller 140 may display the first feedback message 3001 "Speak once more, please." among the plurality of feedback messages shown in FIG. 30. If the voice input button is pressed for the preset time even after the user voice is input in the second voice task mode, the controller 140 may display the first feedback message 3101 "Take your hand off from the button." among the plurality of feedback messages shown in FIG. 31. If the voice input button is not pressed for the preset time after the user voice is input in the second voice task mode, the controller 140 may display the first feedback message 3201 "Speak a command you want, please." among the plurality of feedback messages shown in FIG. 32.

As described above, the feedback message defaulted according to the voice task mode and the type of voice recognition error may be set in the manufacture and may be changed by handling of the user.

If the voice recognition error repeatedly occurs, the controller 140 may randomly display one of the other feedback messages except for the defaulted feedback message. For example, if the voice recognition error repeatedly occurs in the first voice task mode, the controller 140 may randomly display one of the other feedback messages 2902 through 2913 except for the first feedback message 2901 shown in FIG. 29. If the user voice input in the second voice task mode is not repeatedly recognized, the controller 140 may display one of the other feedback messages 3002 through 3015 except for the first feedback message 3001 shown in FIG. 30. If the voice input button is continuously pressed even after the user voice is input in the second voice task mode, the controller 140 may randomly display one of the other feedback messages 3102 through 3107 except for the first feedback message 3101 shown in FIG. 31 every preset time (e.g., every 10 seconds). If the user voice is not continuously input for a preset time after the voice input button is pressed in the second voice task mode, the controller 140 may randomly display one of the other feedback messages 3202 through 3206 except for the first feedback message 3201 shown in FIG. 32 every preset time (e.g., every 10 seconds).

As described above, a plurality of feedback messages may be differently provided according to voice recognition errors and voice task modes. Therefore, the user may accurately check an error in voice recognition. Also, the user may obtain an effect of speaking to an display apparatus, and thus entertainment element may be increased.

A method of providing a feedback message if a voice recognition error occurs in the display apparatus 100 will now be described in more detail with reference to FIG. 33.

Figure 33:
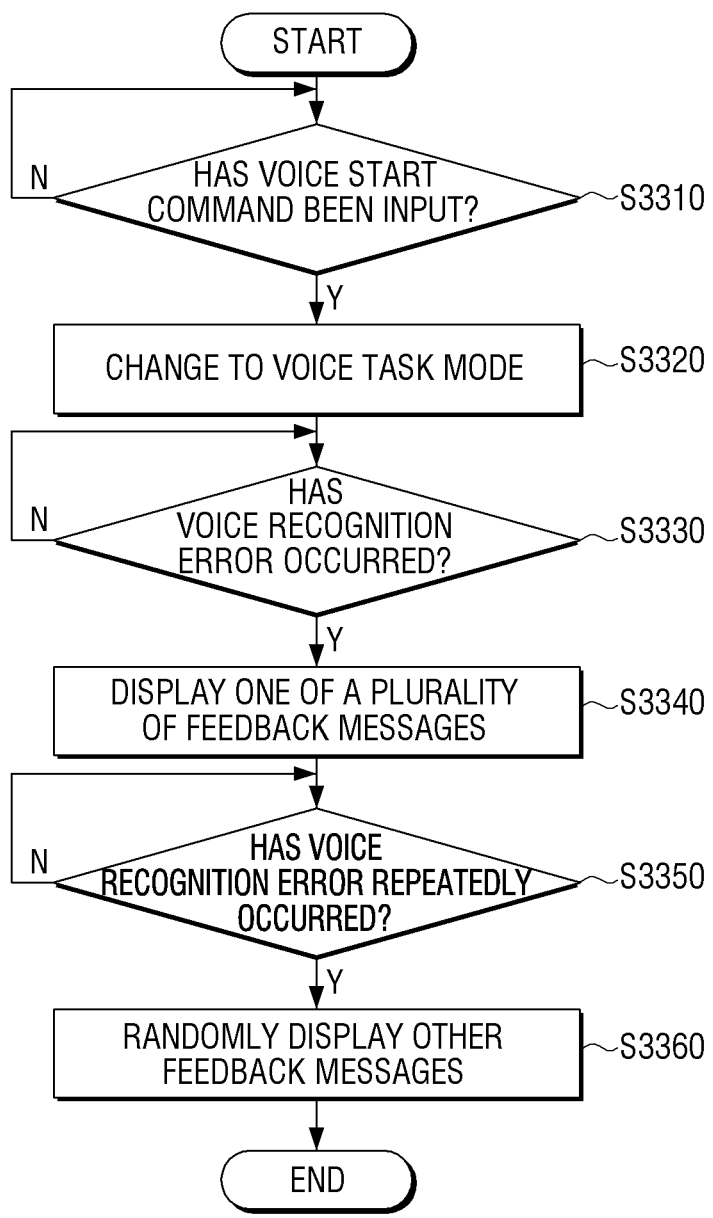
FIG. 33 is a flowchart illustrating a method of controlling an display apparatus, according to an exemplary embodiment.
Figure 34:
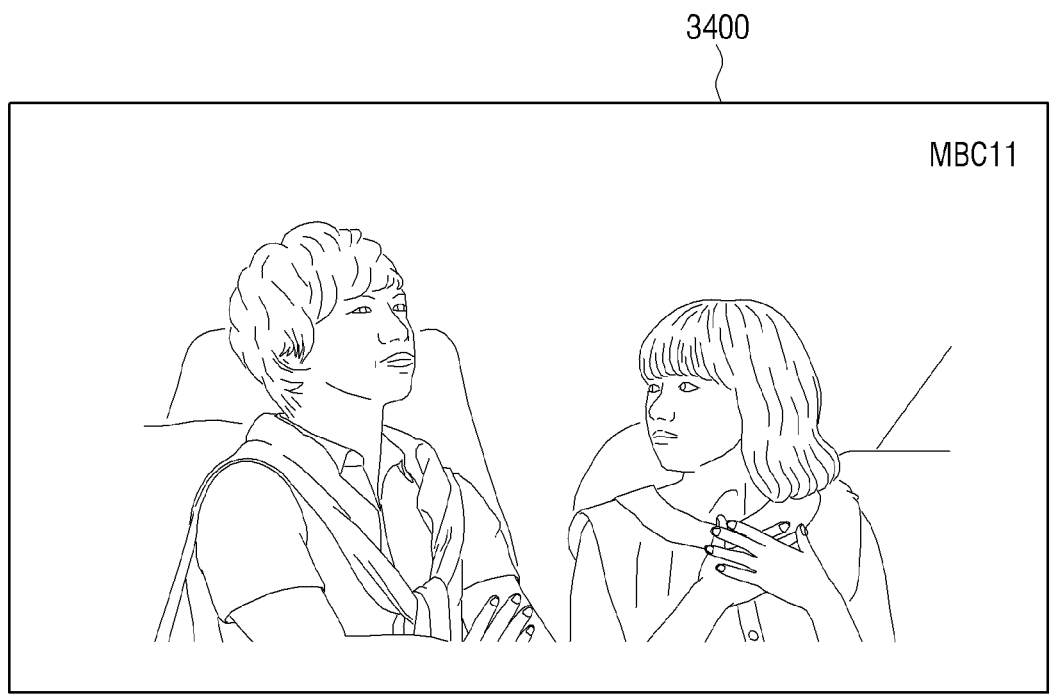
FIGS. 34 and 35 are views illustrating general voice guide information in a voice task mode, according to an exemplary embodiment.

Referring to FIG. 33, in operation (S3310), the display apparatus 100 determines whether a voice start command has been input. Here, the voice start command is a user command which is to change a mode of the display apparatus 100 to a voice task mode and may include first and second voice start commands. The first voice start command is user voice command which includes a preset word input through the voice input unit 110 of the display apparatus 100, and the second voice start command is a user command which is to press a preset button of an external apparatus (e.g., a remote control) which operates along with the display apparatus 100.

If it is determined in operation (S3310-Y) that the voice start command has been input, the display apparatus 100 changes the mode thereof to the voice task mode in operation (S3320). Here, if the voice start command is the first voice start command, the display apparatus 100 changes the mode thereof to a first voice task mode which is controlled by user voice input through the voice input unit 110 of the display apparatus 100. If the voice start command is the second voice start command, the display apparatus 100 changes the mode thereof to a second voice task mode which is controlled by user voice input through the voice input unit 110 of the external apparatus.

When the voice task mode is performed, the display apparatus 100 determines whether a voice recognition error has occurred, in operation (S3330). Here, the case whether the voice recognition error occurs may include at least one of a case where the user voice input through the voice input unit 110 is lower than a preset value, a case where a voice DB does not include a command matching with a recognition result of the user voice input through the voice input unit 110, and a case whether the user is inexperienced in handling the display apparatus 100.

If it is determined in operation (S3330-Y) that the voice recognition error has occurred, the display apparatus 100 displays one of a plurality of feedback messages in operation (S3340). Here, the feedback messages may be differently displayed according to voice task modes and voice recognition errors. For example, if the voice recognition error occurs in the first voice task mode, the display apparatus 100 displays one of the plurality of feedback messages 2901 through 2913 shown in FIG. 29. If the voice recognition error occurs in the second voice task mode, the display apparatus 100 may display one of the plurality of feedback messages 3001 through 3015, 3101 through 3107, and 3201 through 3206 shown in FIGS. 30 through 32. Here, if the voice recognition error occurs for the first time, the display apparatus 100 may display a defaulted one of the plurality of feedback messages.

In operation (S3350), the display apparatus 100 determines whether the voice recognition error has repeatedly occurred.

If it is determined in operation (S3350-Y) that the voice recognition error has repeatedly occurred, the display apparatus 100 randomly displays the other ones of the plurality of feedback messages in operation (S3360). For example, if the voice recognition error has repeatedly occurred in the first voice task mode, the display apparatus 100 may randomly display one of the other feedback messages 2902 through 2913 except for the first feedback message 2901 shown in FIG. 29. If the user voice input in the second voice task mode is not repeatedly recognized, the display apparatus 100 may display one of the other feedback messages 3002 through 3015 except for the first feedback message 3001 shown in FIG. 30. If the voice input button is continuously pressed even after the user voice is input in the second voice task, the display apparatus 100 may randomly display one of the other feedback messages 3102 through 3107 except for the first feedback message 3101 shown in FIG. 31 every preset time (e.g., every 10 seconds). If the user voice is not continuously input for a preset time after the voice input button is pressed in the second task mode, the display apparatus 100 may randomly display one of the other feedback messages 3202 through 3206 except for the first feedback message 3201 shown in FIG. 32 every preset time (e.g., every 10 seconds).

As described above, a plurality of feedback messages may be differently provided according to voice recognition errors and voice task modes. Therefore, a user may accurately check an error in voice recognition. Also, the user may obtain an effect of speaking to an display apparatus, and thus entertainment element may be increased.

Hereinafter, an exemplary embodiment of providing different guide information according to application or user preference will be explained with reference to FIGS. 34 to 38.

The controller 140 determines whether or not a voice start command directing to enter voice task mode has been input. If it is determined that the voice start command has been input, the controller 140 changes the mode of the display apparatus 100 to the voice task mode. As used herein, the 'voice task mode' refers to a mode on which the display apparatus 100 is controlled by the user voice input by the voice input unit 110. As aforementioned, other kinds of user commands for starting the voice task mode may be used instead of the voice start command. Other kinds of user commands may include input of a particular button of the remote control, input of a particular button of the display apparatus 100, and a particular motion of the user etc. In the voice task mode, the controller 140 displays voice guide information on the display screen. The voice guide information may include a plurality of voice commands to guide the user voice to perform the voice task mode.

In response to the user's specific command, the controller 140 changes at least one of the plurality of voice commands included in the voice guide information with another voice command. As used herein, the user's 'specific command' may refer to a user command directing to execute a specific application, or to execute the user's preferred voice command.

The voice guide information may include a fixed command area on which part of voice commands from among a plurality of voice commands (e.g., "Power off" voice command) are fixedly displayed, and a variable command area on which the voice command is varied. Accordingly, in response to the user's specific command, the controller 140 may change the voice command of the voice guide information which is included in the variable area with a different command.

In one embodiment, in response to a user command directing to execute a specific application, the controller 140 may execute the application corresponding to the user command. The controller 140 may then change at least one command of the plurality of voice commands included in the voice guide information with a voice command necessary for the executed application.

The voice command necessary for the application may be stored at the storage unit 130 of the display apparatus 100 during installation of the application. Then in response to a command directing to execute the application, the controller 140 may read out the stored voice command necessary for the application and display the read voice command on the display 193.

In another embodiment, in response to a user command directing to display the user's preferred voice command, the controller 140 may change at least one command from among the plurality of voice commands included in the voice guide information with the user's preferred command. The user's preferred voice command may be a voice command registered by the user in advance by using a voice command setting menu.

The changed voice guide information may include the voice command to return to the voice guide information before change. By way of example, a voice command "Finish" may be included as a voice command to return to the voice guide information before change.

Accordingly, the user is able to perform the voice task mode by utilizing the voice guide information which is optimized for each application and which meets the user's preference. The embodiments will be explained in greater detail below with reference to FIGS. 34 to 37.

Figure 4:
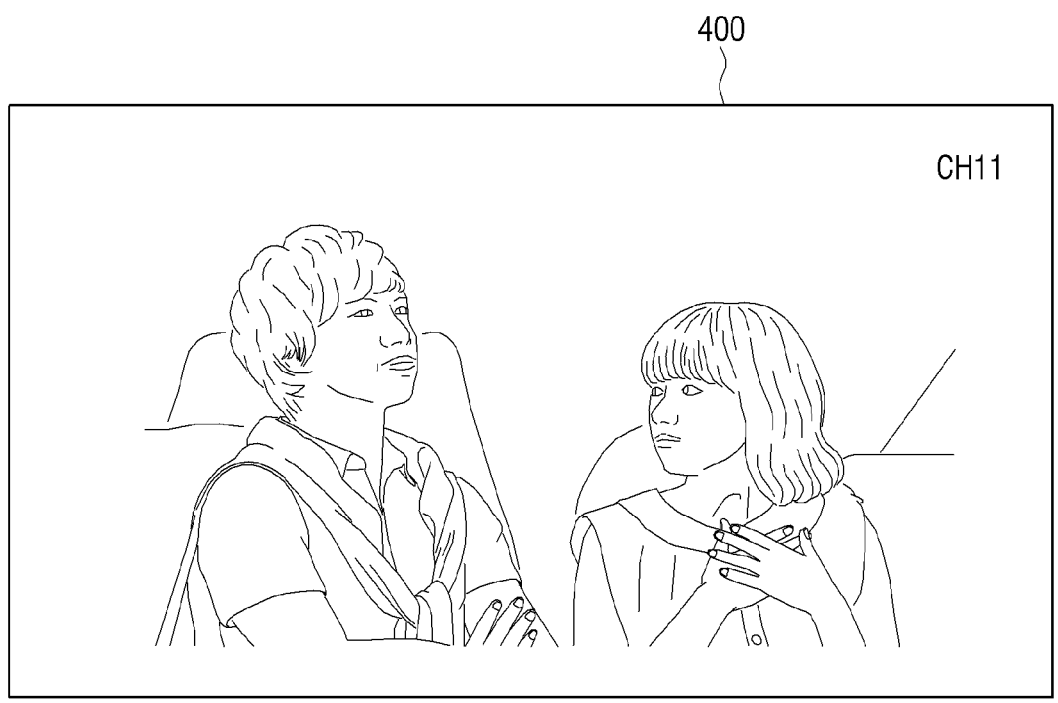
FIGS. 4 to 7 are views illustrating a method of providing different voice guide information depending on an external device connected to the display apparatus, according to an exemplary embodiment.

In an exemplary embodiment, the controller 140 receives a broadcast signal from an external broadcast station via the broadcast receiver 150, and performs signal-processing on the received broadcast signal to display the broadcast signal on display screen 3400. Referring to FIG. 4, the controller 140 then displays the signal-processed broadcast image on the display 193.

When a voice start command is input through the voice input unit 110, the controller 140 changes to the voice task mode. As used herein, the 'voice start command' refers to a user command directing to change the operation to the voice task mode in which the display apparatus 100 is controlled by the user voice as input to the voice input unit 110. Other kinds of user command for starting the voice task mode may be used instead of the motion start command. Other kinds of user commands may include inputting a particular button of a remote control, inputting a particular button of the display apparatus 100, and particular voice of the user etc.

Figure 35:
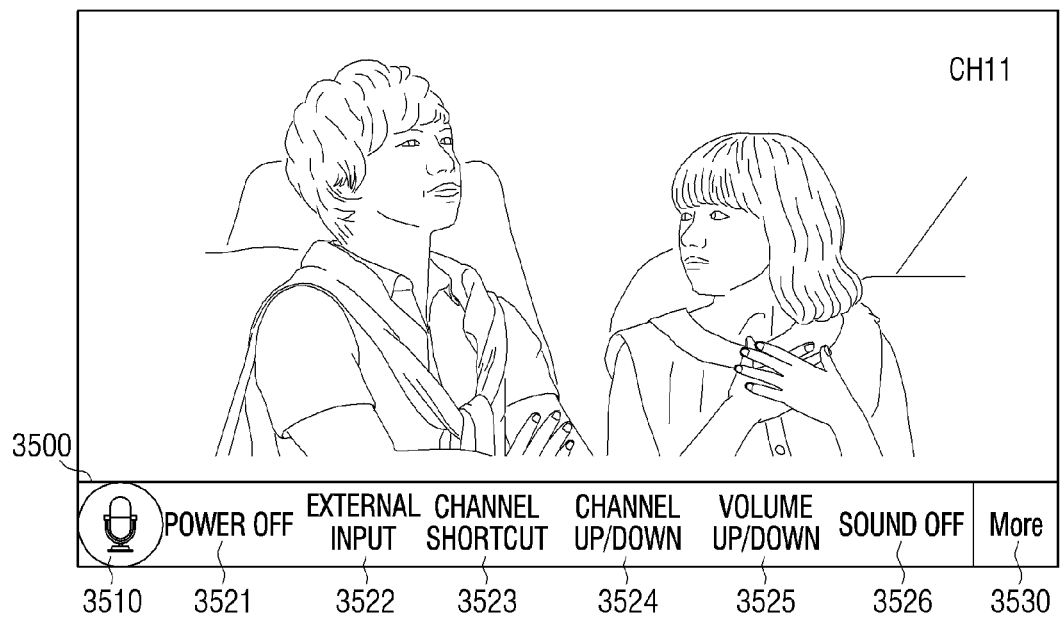

In the voice task mode, the controller 140 displays first voice guide information 3500 to perform the voice task mode (see FIG. 35). The first voice guide information 3500 may be displayed on the bottom of the displayed broadcast image.

The first voice guide information 3500 may include an icon 3510 indicating the current mode of the display apparatus to be in voice task mode and a plurality of voice commands 3521 to 3526, 3530 guiding the user voice. The plurality of voice commands may include power-off voice command 3521, an external input voice command 3522, a fast channel change voice command 3523, a channel up/down voice command 3524, a volume up/down voice command 3525, a silencing voice command 3526, and a MORE voice command 3530. By using the MORE voice command 3530, the user may view more voice commands than those currently displayed. The power-off voice command 3521 and the MORE voice command 3530 may be placed in a fixed command area which is fixedly displayed, while the external input voice command 3522, the fast channel change voice command 3523, the channel up/down voice command 3524, the volume up/down voice command 3525, the silencing voice command 3526 may be placed in a changeable command area which is subject to change.

Figure 36:
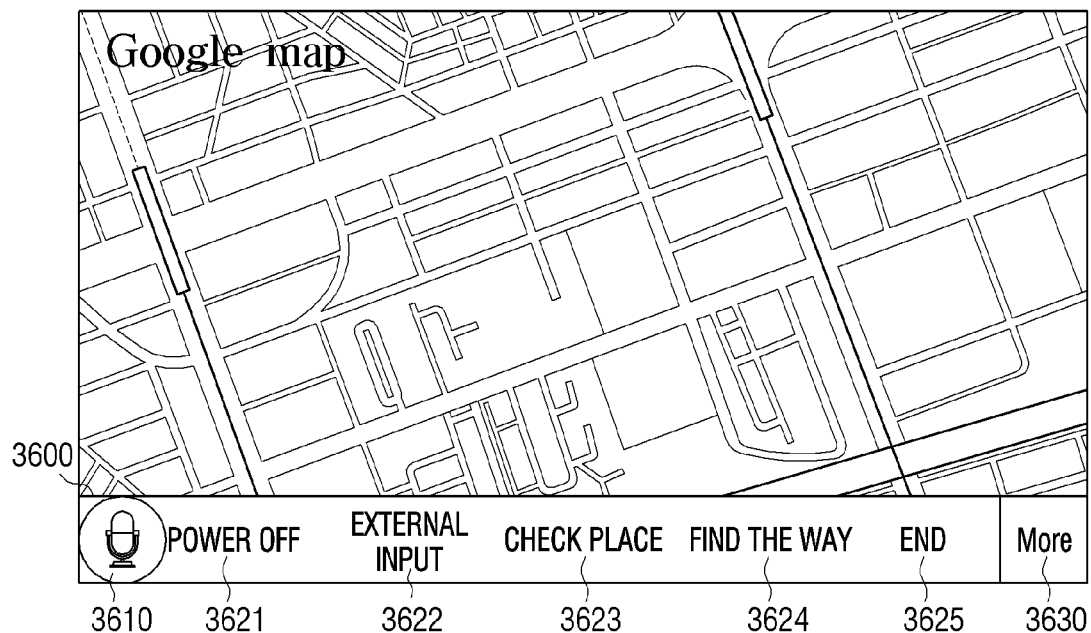
FIG. 36 is a view illustrating voice guide information specialized to an application in a voice task mode, according to an exemplary embodiment.

Referring to FIG. 36, in response to a command directing to execute a map application, the controller 140 may execute the map application and change the first voice guide information 3500 to the second voice guide information 3600 corresponding to the map application and may include an icon 3610.

Specifically, with the executing of the map application, the controller 140 reads out voice command corresponding to the map application from among the voice commands stored in the storage unit 130. The controller 140 then changes the voice command displayed in the changeable command area with the read voice command.

By way of example, referring to FIG. 36, the controller 140 displays the power-off voice command 3621 and the MORE voice command 3630 as these are displayed in the fixed command area. However, the controller 140 may change the external input voice command 3522, the fast channel change voice command 3523, the channel up/down voice command 3524, the volume up/down voice command 3525, the silencing voice command 3526 with an external input voice command 3622, a place finder voice command 3623, a directions-giving voice command 3624, and an ending voice command 3625. The ending voice command 3625 guides the user voice to return to the voice guide information before change. With the executing of the end voice command 3625, the controller 140 may end the corresponding application together.

Accordingly, the user is easily able to check the functions currently available by using the map application, from the voice guide information.

Figure 37:
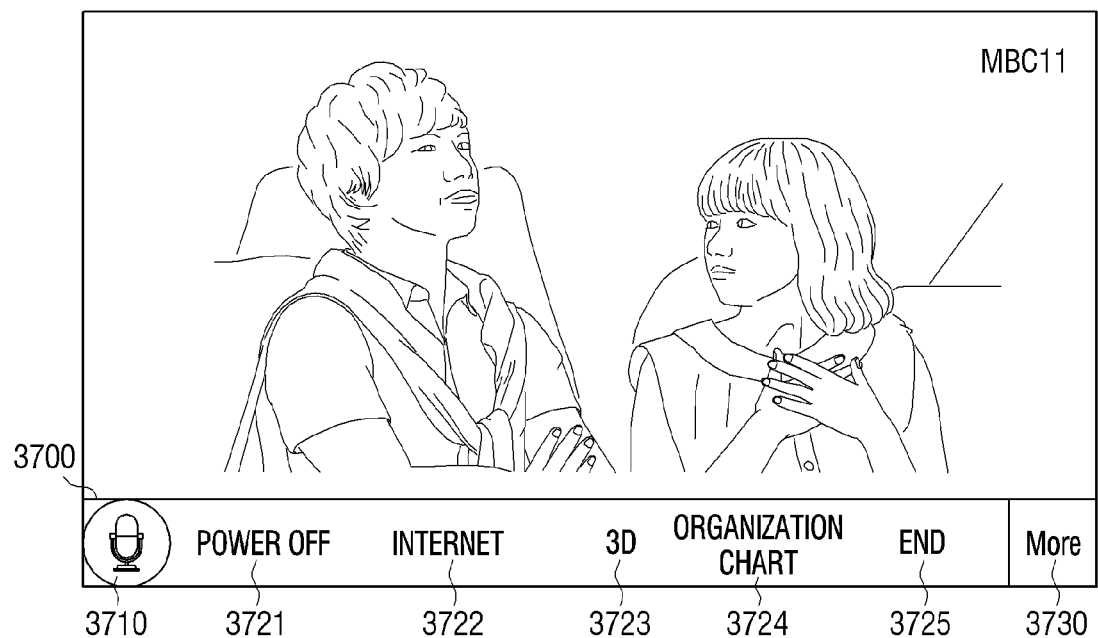
FIG. 37 is a view illustrating voice guide information in which a user preference voice command is included in a voice task mode, according to an exemplary embodiment.

In another embodiment, if the user command for executing a preferred voice command (for example, "Favorite" user voice) is input with the first voice guide information displayed as in FIG. 35, the controller 140 changes the voice guide information 3500 to third voice guide information 3700 where a user preference voice command is included as in FIG. 37.

In more detail, when the user command to execute the user preference voice command is input, the controller 140 reads the user preference voice command stored in the storage unit 130. In addition, the controller 140 changes the voice command displayed on the change command area to the read voice command.

For example, as illustrated in FIG. 37, the controller 140 displays may include an icon 3510, the power off voice command 3721 and MORE voice command 3730 displayed on the fixed command area as they are. In addition, the controller 140 may change the external input voice command 3522, channel shortcut voice command 3523, channel up/down voice command 3524, volume up/down voice command 3525, sound off voice command 3526, displayed on the change command area to internet voice command 3722, 3D voice command 3723, organization chart vice command 3724, and end voice command 3725. Herein, the end voice command 3725 is a voice command which guides user voice input for returning to the first voice guide information before changing.

Therefore, the user is able to control the display apparatus 100 using the voice commands that he/she prefers.

Figure 38:
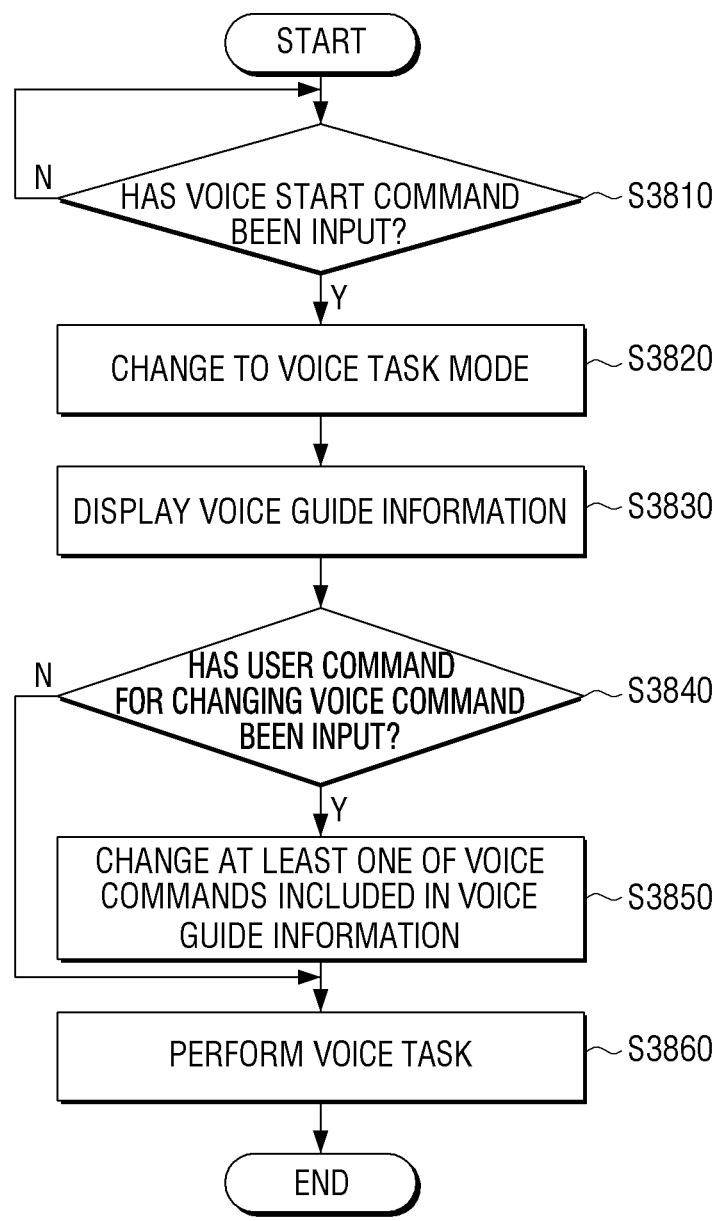
FIG. 38 is a flowchart illustrating a method of controlling an display apparatus for changing a portion of a voice command of an application, according to an exemplary embodiment.

FIG. 38 is a flowchart for explaining a method of changing a voice command in the voice guide information, according to an exemplary embodiment.

First of all, the display apparatus 100 determines at (S3810) whether or not a voice start command has been input. Herein, the voice start command is a user command for converting the mode of the display apparatus 100 to the voice task mode.

When the voice start command is input (S3810-Y), the display apparatus 100 converts the control mode of the display apparatus 100 to the voice task mode (S3820). Herein, the voice task mode is a mode controlled by the user voice input through the voice input unit 110.

In the voice task mode, the display apparatus 100 displays the voice guide information at (S3830). Herein, if the display apparatus 100 performs a broadcast receiving function, the voice guide information includes a voice command for controlling the broadcast receiving function.

At S3840, the display apparatus 100 determines if the user command directing to change the voice command is input. By way of example, the display apparatus 100 determines if the user command directing to execute a specific application (e.g., map application), and if the user command directing to display the favorite voice command is input.

At (S3840-Y), if determining that the user command directing to change the voice command is input, at (S3850), the display apparatus 100 changes at least one of voice commands included in the voice guide information. Among the voice commands included in the voice guide information, the voice command displayed on the changeable command area may be the at least one voice command to be changed.

By way of example, if the user command directing to execute a specific application is input as the command to change the voice command, among the voice commands included in the voice guide information, the display apparatus 100 may change the voice commands displayed on the changeable command area with a voice command corresponding to the specific application. If the user command directing to display a favorite voice command is input as the command to change the voice command, among the voice commands included in the voice guide information, the display apparatus 100 may change the voice command displayed on the changeable command area with the favorite voice command.

At (S3860), the display apparatus 100 performs voice tasks using the changed voice guide information.

As explained above, since different voice guide information is provided depending on the application executed on the display apparatus and user preference, the user is able to control the display apparatus more conveniently and efficiently.

Although it is assumed that the voice guide information is changed in explaining the embodiments with reference to FIGS. 34 to 38, this is only written for illustrative purpose. Accordingly, the technical concept of an embodiment is equally applicable to an example where the motion command included in the motion guide information to perform the motion task mode.

In more detail, if a motion start command is input through the motion input unit 120, the controller 140 changes the mode of the display apparatus to a motion task mode in which the display apparatus is controlled in accordance with the user's motion. The controller 140 then displays the motion guide information including a plurality of motion commands to perform the motion task mode on the display apparatus 900.

If a command directing to execute an application is input in a state that the motion guide information is displayed, the controller 140 may change at least one of the plurality of motion commands with a motion command corresponding to the application.

As explained above, since the motion command is changed in accordance with the application executed on the display apparatus, the user is able to control the display apparatus more conveniently and efficiently.

Meanwhile, in the above embodiments, the external device for controlling the display apparatus 100 was the remote control, but this is merely an exemplary embodiment, and thus portable terminals such as a smart phone, PDA may be used to control the display apparatus 100.

Program codes to execute a control method according to various embodiments may be recorded on various types of recording media. Specifically, the program codes may be recorded on a variety of recording media readable on a terminal, such as, RAM (Random Access Memory), Flash memory, ROM (Read Only Memory), EPROM (Erasable Programmable ROM), EEPROM (Electronically Erasable and Programmable ROM), register, hard disk, removable disk, memory card, USB memory, or CD-ROM.

Although a few exemplary embodiments have been shown and described, it would be appreciated by those skilled in the art that changes may be made to the exemplary embodiments without departing from the principles and spirit of the inventive concept, the scope of which is defined in the claims and their equivalents.

What is claimed is:

1. A method of setting a view angle of an electronic apparatus, the method comprising:

in response to an occurrence of a predetermined event, displaying, on an area of a display screen, a view angle guiding user interface (UI) which guides a user through setting a view angle of a camera connected to the electronic apparatus; and setting the view angle of the camera using the view angle guiding UI, wherein the view angle guiding UI includes an image photographed when adjusting a location and the view angle of a camera, and wherein the view angle guiding UI comprises a screen which displays the image that is being photographed by the camera during the setting of the view angle and instructions about the setting of the view angle, the photographed image being displayed over a second image displayed on display screen.

2. The method according to claim 1, wherein, when an event of entering a motion task mode occurs, the view angle guiding UI is not displayed, wherein the motion task mode is a mode in which the electronic apparatus receives an input based on a user motion.

3. The method according to claim 1, wherein the setting comprises:

adjusting the camera so that the view angle of the camera automatically moves in a predetermined direction at a predetermined speed, when a user command is input during the adjusting the camera, setting the view angle, at a point when the user command has been input, as the view angle of the camera.

4. The method according to claim 1, wherein the setting comprises:

adjusting the camera according to a user's manipulation using an external device, when a user command is input during the adjusting the camera, setting the view angle, at a point when the user command has been input, as the view angle of the camera.

5. The method according to claim 1, wherein the predetermined event is one of an event where power is applied to the electronic apparatus during an initial installation of the electronic apparatus, an event where a motion task mode is turned on, and an event where a view angle setting menu is selected from among control menus of the electronic apparatus, wherein the motion task mode is a mode in which the electronic apparatus receives an input based on a user motion.

6. The method according to claim 1, wherein the camera is a motion capture camera which photographs a user's motion for controlling the electronic apparatus in a motion task mode, wherein the motion task mode is a mode in which the electronic apparatus receives an input based on a user motion.

7. An electronic apparatus comprising:

a camera which is configured to photograph a user's motion;

a display; and a controller which, in response to an occurrence of a predetermined event, displays, on an area of the display, a view angle guiding user interface (UI) which guides a user through setting a view angle of the camera and sets the view angle of the camera using the view angle guiding UI, wherein the view angle guiding UI includes an image photographed when adjusting a location and the view angle of a camera, and wherein the view angle guiding UI comprises a screen which displays the image that is being photographed by the camera during the setting of the view angle and instructions about the setting of the view angle, the photographed image being displayed over a second image displayed on display screen.

8. The electronic apparatus according to claim 7, wherein, when an event of entering a motion task mode occurs, the controller does not display the view angle guiding UI and displays a screen provided by the electronic apparatus, wherein the motion task mode is a mode in which the controller receives an input based on a user motion.

9. The electronic apparatus according to claim 7, wherein the controller adjusts the camera so that the view angle of the camera automatically moves in a predetermined direction at a predetermined speed, wherein, when a user command is input during the adjusting of the camera, the controller sets the view angle, at a point when the user command is input, as the view angle of the camera.

10. The electronic apparatus according to claim 7, wherein the controller adjusts the camera according to a user's manipulation using an external device, wherein, when a user command is input during the adjusting of the camera, the controller sets the view angle, at a point when the user command is input, as the view angle of the camera.

11. The electronic apparatus according to claim 7, wherein the predetermined event is one of an event where power is applied to the electronic apparatus during an initial installation of the electronic apparatus, an event where a motion task mode is turned on, and an event where a view angle setting menu is selected from among control menus of the electronic apparatus, wherein the motion task mode is a mode in which the controller receives an input based on a user motion.

12. The electronic apparatus according to claim 7, wherein the camera is a motion capture camera which photographs a user's motion for controlling the electronic apparatus, in a motion task mode, wherein the motion task mode is a mode in which the controller receives an input based on a user motion.

13. A method of setting a view angle of an electronic apparatus, the method comprising:

displaying a view angle guiding user interface (UI) which guides a user through setting a view angle of a camera; and setting the view angle of the camera using the view angle guiding UI, wherein the view angle guiding UI includes an image photographed when adjusting a location and the view angle of a camera, and wherein the view angle guiding UI comprises a screen which displays the image that is being photographed by the camera during the setting of the view angle and instructions about the setting of the view angle, the photographed image being displayed over a second image displayed on display screen.

14. The method according to claim 13, further comprising:

automatically adjusting an angle of the camera at a predetermined speed; and receiving a user command during the adjusting of the angle of the camera, wherein the setting of the view angle of the camera sets the view angle of the camera to the angle of camera at a point in time when the user command is received.

15. The method according to claim 13, wherein the displaying the view angle guiding UI occurs in response to an occurrence of a predetermined event comprising at least one from among an event where power is applied to the electronic apparatus during an initial installation of the electronic apparatus, an event where a motion task mode is turned on, and an event where a view angle setting menu is selected from among control menus of the electronic apparatus, wherein the motion task mode is a mode in which the electronic apparatus receives an input based on a user motion.

\* \* \* \* \*